(12) United States Patent
Su et al.

(10) Patent No.: US 6,845,380 B2
(45) Date of Patent: Jan. 18, 2005

(54) METHOD AND SYSTEM OF VALUING TRANSFORMATION BETWEEN EXTENSIBLE MARKUP LANGUAGE (XML) DOCUMENTS

(75) Inventors: Hong Su, Worcester, MA (US); Harumi Anne Kuno, Cupertino, CA (US); Elke Angelika Rundensteiner, Acton, MA (US); Umeshwar Dayal, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 383 days.

(21) Appl. No.: 10/092,094

(22) Filed: Mar. 4, 2002

(65) Prior Publication Data

US 2003/0167254 A1 Sep. 4, 2003

(51) Int. Cl.[7] .............................................. G06F 17/30
(52) U.S. Cl. ...................... 707/102; 715/501; 715/513; 715/522; 707/101; 707/6
(58) Field of Search ................................ 715/501, 512, 715/513, 522, 523, 530; 707/104, 103, 102, 101, 10, 6, 3, 2

(56) References Cited

U.S. PATENT DOCUMENTS

| | | | | |
|---|---|---|---|---|
| 6,480,865 B1 | * | 11/2002 | Lee et al. | 715/523 |
| 6,560,633 B1 | * | 5/2003 | Roberts et al. | 709/202 |
| 6,708,186 B1 | * | 3/2004 | Claborn et al. | 707/102 |
| 6,725,231 B2 | * | 4/2004 | Hu et al. | 707/102 |
| 2003/0149934 A1 | * | 8/2003 | Worden | 715/513 |
| 2003/0167445 A1 | * | 9/2003 | Su et al. | 715/513 |

OTHER PUBLICATIONS

Su et al., "Automating the transformation of XML documents", AMC, 2001, pp. 68–75.*
Villard et al.,"An incremental XSLT Transformation processor for XML document manipulation", ACM, May 2002, pp. 474–485.*
Vanoirbeek et al., "Automating XML documents transformations: A conceptual modelling based approach", ACM, pp. 81–90.*
Pietriga et al., "A visual approach to XML transformation", ACM, Nov. 2001, pp. 1–10.*
Yokota et al., "Semantic extensions of xml for Advanced applications", IEEE, 2001, pp. 49–57.*
Chaudhuri et al., "On relational support for XML publishing: Beyond sorting and tagging", ACM, Jun. 9–12, 2003, pp. 611–622.*
Guha et al., Sudipto et al., "Approximate XML joins", ACM, Jun. 4–6, 2002, pp. 287–298.*

* cited by examiner

*Primary Examiner*—Jean M. Corrielus

(57) ABSTRACT

A method and system of valuing transformation between XML documents. Specifically, one embodiment of the present invention discloses a method for calculating a transformation cost for a transformation operation that transforms a source node in a source XML document to a target node in a target XML document. A data loss and potential data loss is measured for the transformation operation. Also, the operands in the transformation operation are scaled to measure their impact on the data loss and potential data loss. A transformation cost is calculated by considering the data loss, potential data loss, and scaling.

26 Claims, 16 Drawing Sheets

METHOD AND SYSTEM OF VALUING TRANSFORMATION BETWEEN EXTENSIBLE MARKUP LANGUAGE (XML) DOCUMENTS

TECHNICAL FIELD

The present invention relates to the field of valuing the cost of document transformation between two extensible markup language (XML) documents.

BACKGROUND ART

Web services are significantly more loosely coupled than traditional applications. Web Services are deployed on the behalf of diverse enterprises, and the programmers who implement them are unlikely to collaborate with each other during development. However, the purpose of web-services is to enable business-to-business interactions. As such, one of the goals of web services is for the discovery of new services that allow interaction without requiring programming changes to either service.

The advent of web services that use XML-based message exchanges has spurred many efforts to address issues related to inter-enterprise service electronic commerce interactions. Currently, emerging standards and technologies enable enterprises to describe and advertise their own Web Services and to discover and determine how to interact with services fronted by other businesses. However, these technologies do not address the problem of how to reconcile structural differences between similar types of documents supported by different enterprises. Heretofore, transformations between such documents was a manual process created on a case-by-case basis.

For example, Service A and Service B are services provided by different companies. Suppose that these services want to engage in a shopping cart interaction, and that Service B requires Service A to submit a shipping information document. Service A might be able to provide this information, but in a slightly different format than Service B expects. For example, the shipping document for Service A might list the address first, whereas the document for Service B might list it last. In another case, Service B might call the zip code element "Postal Code," whereas Service A names it "Zip Code."

One previous solution of service developers is to create a transformation between the two documents by hand. Manual translation of the XML documents is extremely time consuming, and is unacceptable in a web services environment where information sources frequently change and corresponding applications must quickly evolve to meet that change.

In order to automate the transformation of XML documents (e.g., business documents), there are two fundamental problems that need to be addressed. Previous transformation techniques inadequately transformed between XML documents.

First, potential mappings between elements of two documents must be identified. For example, identifying that "Postal Code" in one document corresponds to "Zip Code" in another document. Previously, in the related field of schema translation between relational databases, the analysis and reconciliation between sets of heterogeneous relational schemas was performed by measuring the similarity of element names, data types, and structures. For example, reasoning about queries are used to create initial mappings between relational schemas. These initial mappings are then refined using data examples. However, because relational schemas are flat, hierarchical XML schemas cannot be related using these previous techniques.

Second, a "plan" for performing the actual transformation of the XML document data schemas must be created and can be related to work done in the area of tree matching. Previous techniques address the change detection problem for ordered and unordered trees, respectively. However, previous tree matching techniques are not applicable to the XML domain. For example, prior art tree matching techniques treat the "label" as a second class citizen. As a result, the cost of relabeling is assumed to be cheaper than that of deleting a node with the old label and inserting a node with the new label. This is an invalid assumption for the XML domain.

Thus, a need exists for decreasing the time, cost, and resources spent on transforming one document to another document in the web services industry.

SUMMARY OF THE INVENTION

The present invention provides a method and system for valuing transformation between Extensible Markup Language (XML) documents. Specifically, one embodiment of the present invention discloses a method for calculating a transformation cost for a transformation operation that transforms a source node in a source XML document to a target node in a target XML document. A data loss and potential data loss is measured for the transformation operation. Also, the operands in the transformation operation are scaled to measure their impact on the data loss and potential data loss. A transformation cost is calculated by considering the data loss, potential data loss, and scaling.

The drawings referred to in this description should be understood as not being drawn to scale except if specifically noted.

DETAILED DESCRIPTION

Figure 1:
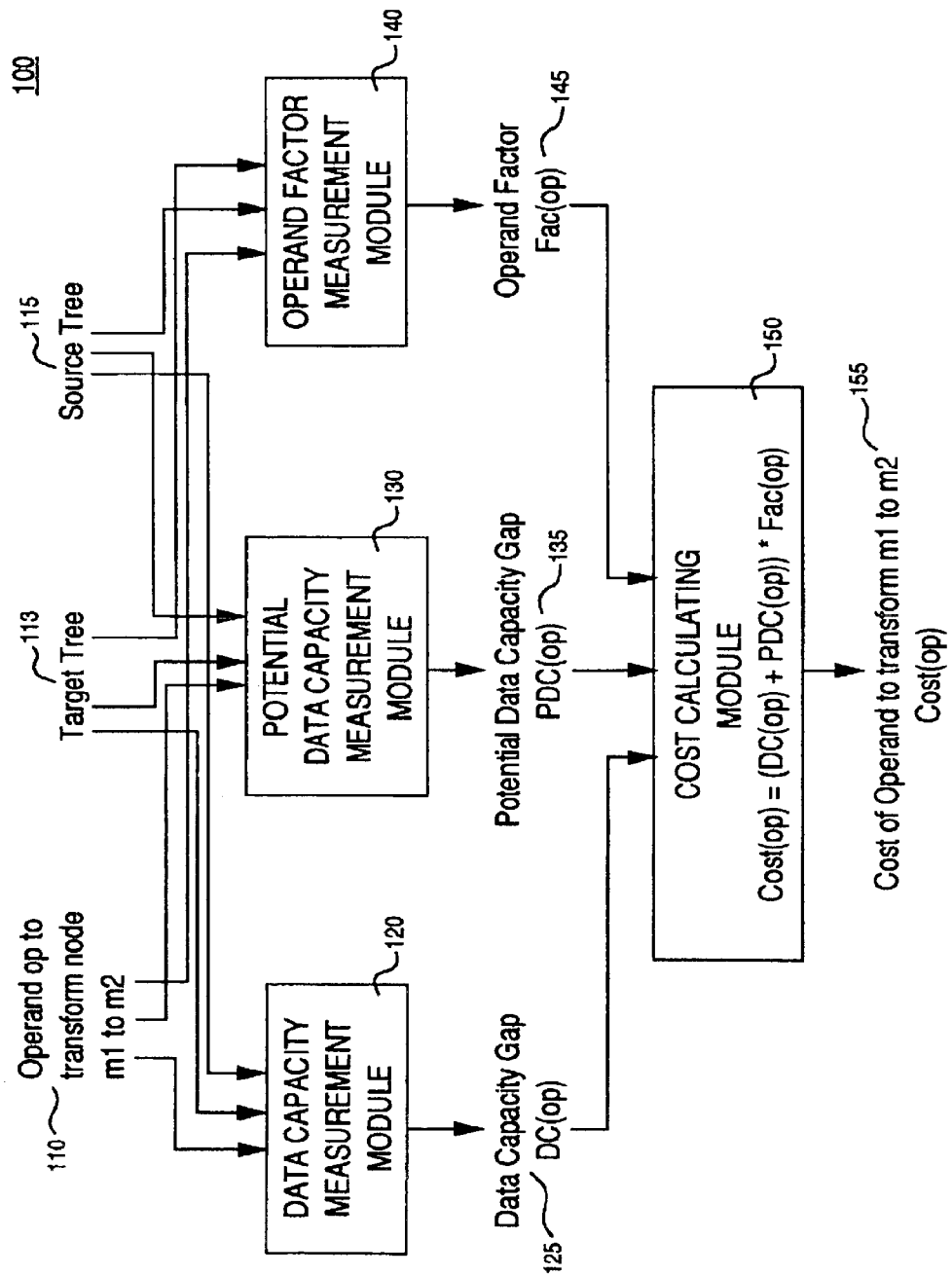
FIG. 1 illustrates a block diagram of an exemplary system that is capable evaluating a cost when transforming a source XML document into a target XML document, in accordance with one embodiment of the present invention.
Figure 2:
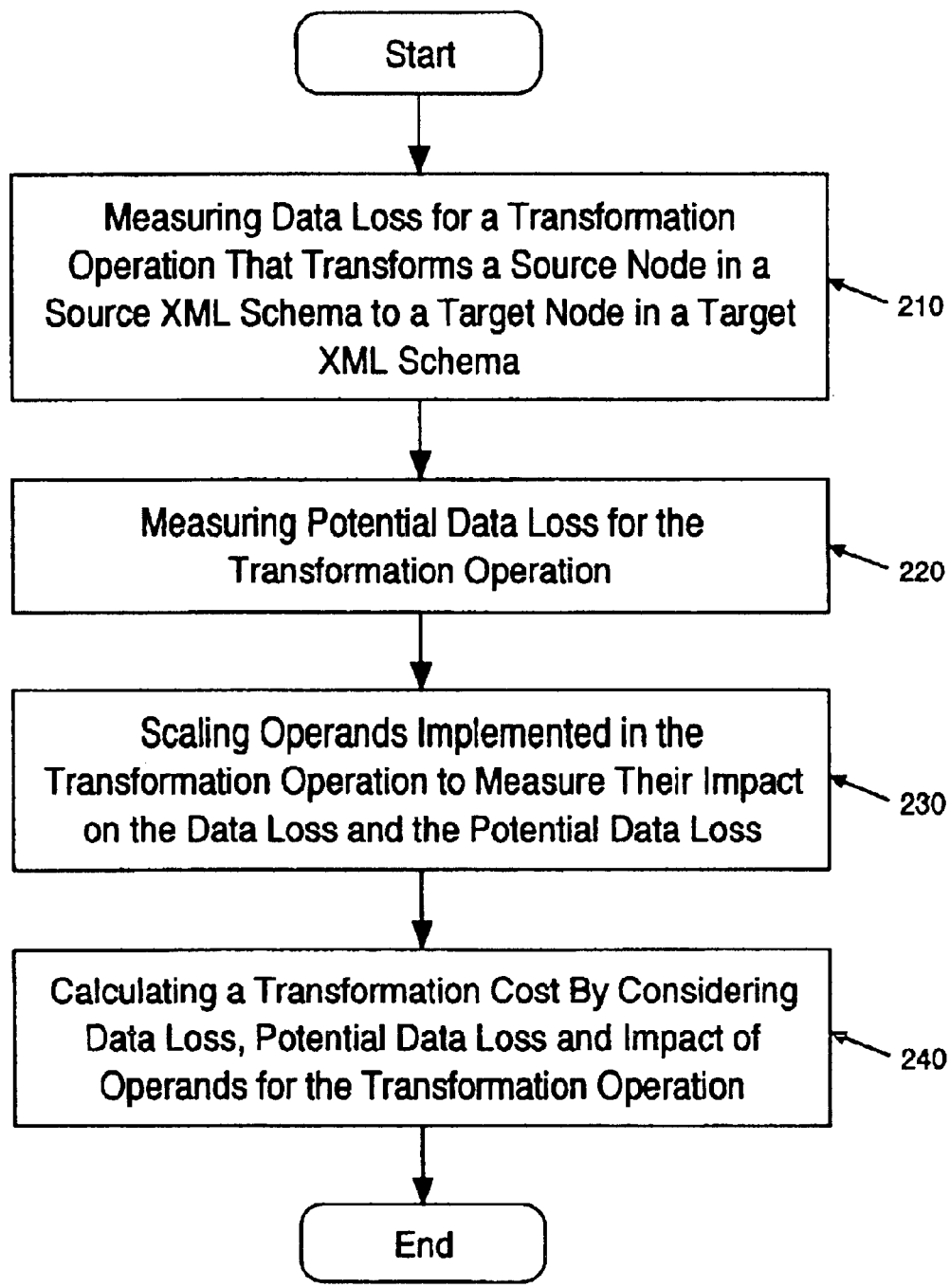
FIG. 2 is a flow diagram illustrating steps in a method for evaluating a transformation cost when transforming a source XML schema to a target XML schema, in accordance with one embodiment of the present invention.

FIG. 1 in combination with FIG. 2 illustrate a method and system for valuing a transformation between two XML documents. FIG. 1 is a block diagram of a system 100 that is capable of evaluating a cost that associated with transforming nodes in one XML schema to nodes in another XML schema, in accordance with one embodiment of the present invention.

The flow chart 200 of FIG. 2 illustrates steps in a method for evaluating a transformation cost for a transformation operation or a sequence of transformation operations, in accordance with one embodiment of the present invention. The transformation operation transforms a node in the source XML document to a matched node in the target XML document. The sequence of transformation operations transforms a source XML document to a target XML document. The source XML document is associated with a source XML schema. The target XML document is associated with a target XML schema.

Embodiments of the present invention are implemented on software running on a computer system. The computer system can be a personal computer, notebook computer, server computer, mainframe, networked computer, handheld computer, personal digital assistant, workstation, and the like.

Referring now to FIG. 1, a system 100 is comprised of four modules that is capable of evaluating transformation cost. The first module is a data capacity measurement module 120. The module 120 measures the actual loss of information when using an operand 110 to transform a node $m_1$ in the source tree 115, corresponding to a source XML document, to a node $m_2$ in the target tree 113, which corresponds to a target XML document. In other words, the module 120 measures the preservation of the capacity of source data that is transformed to the target XML document.

A data capacity gap value 125 is generated. This is also illustrated in step 210 of flow chart 200.

A second module in system 100 is a potential data capacity measurement module 130 that measures the potential of data loss when using the operand 110 to transform node $m_1$ to node $m_2$. In other words, the module 130 measures the potential that a transformed source schema accommodates different data capacity. A potential data capacity gap value 135 or operation is generated. Step 220 of flow chart 200 illustrates the performance of the module 130 in a method for evaluating a transformation cost when transforming between node $m_1$ to $m_2$.

A third module in system 100 is an operand factor measurement module 140 that scales the impact the operand has on the data capacity gap value 125 and the potential data capacity gap value 135. An operand factor 145 is generated from module 140. Step 230 of flow chart 200 illustrates the performance of module 140 for scaling operands. The scaling of operands measures the impact of the operands on data loss and the potential data loss calculated in previous steps 210 and 220.

A fourth module in system 100 is the cost calculating module 150. Module 150 calculates the transformation cost 155 for the operand in transforming node $m_1$ to node $m_2$. The module calculates the transformation cost 155 by considering each of the following inputs: data capacity gap value 125, the potential data capacity gap value 135, and the operand factor 145. Step 240 of flow chart 200 illustrates the performance of module 150 for calculating a transformation cost.

Figure 11:
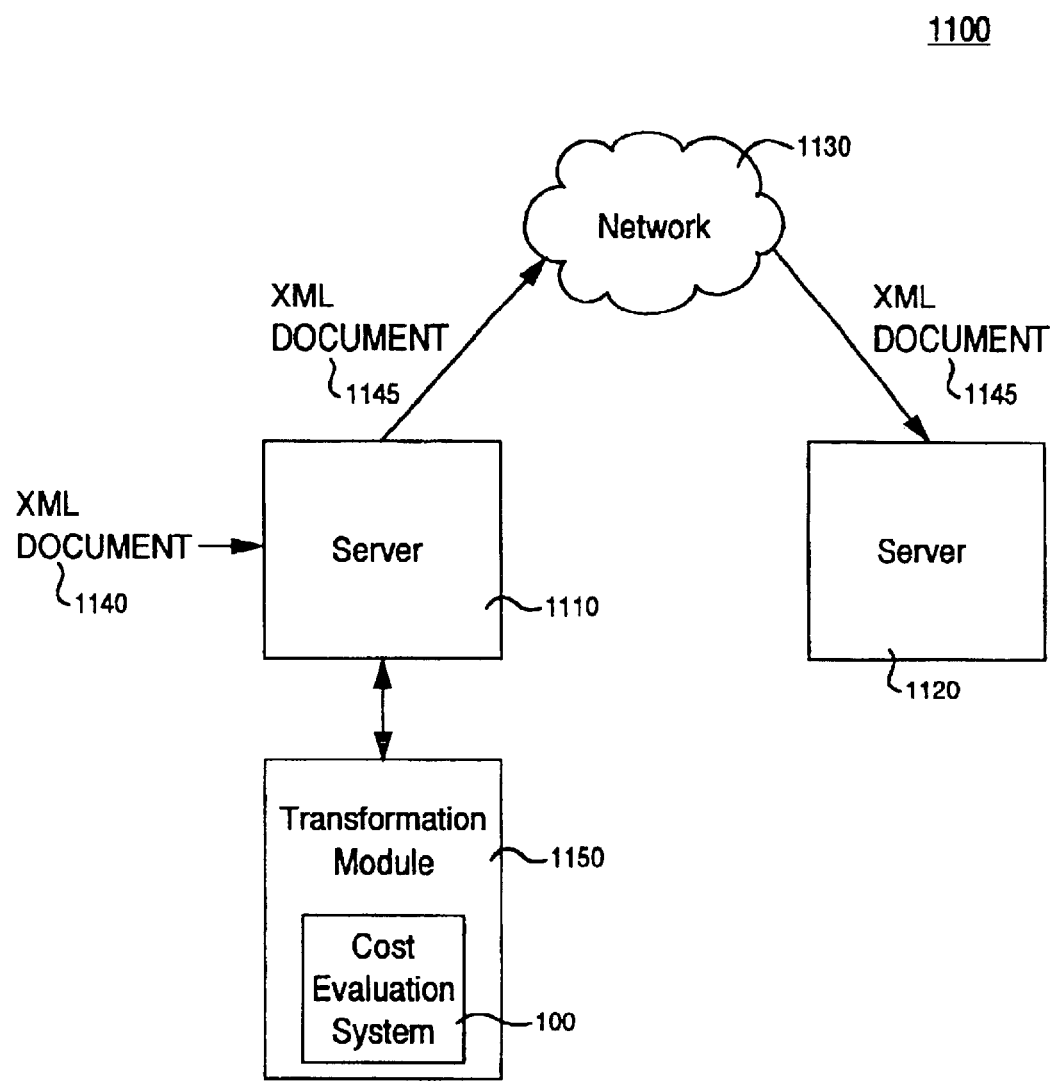
FIG. 11 illustrates a block diagram of an exemplary communication system that is capable of transforming a source XML document into a target XML document, in accordance with various embodiments of the present invention.
Figure 12:
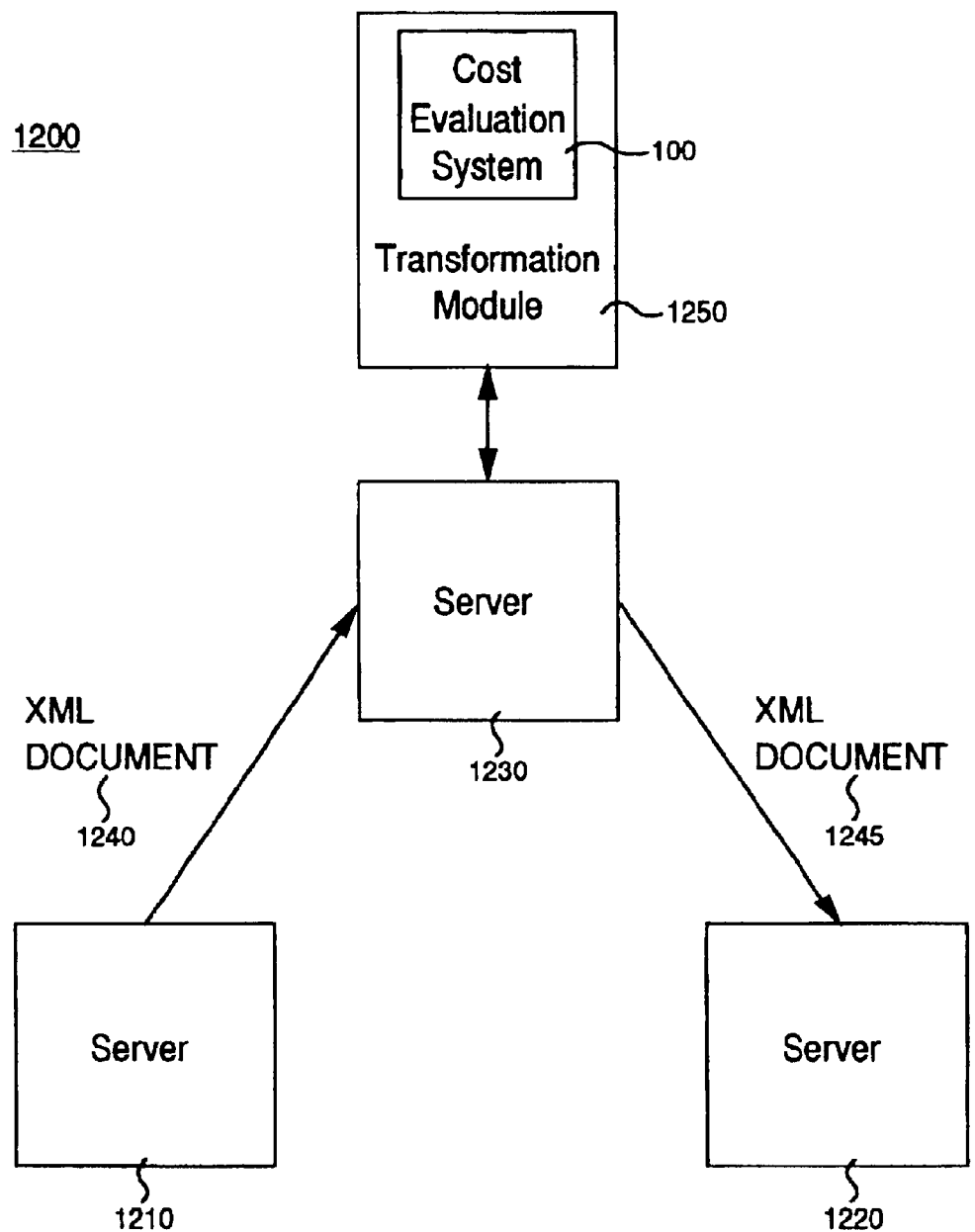
FIG. 12 illustrates a block diagram of an exemplary communication system that is capable of transforming a source XML document into a target XML document, in accordance with various embodiments of the present invention.

FIGS. 11 and 12 are block diagrams of communications systems 1100 and 1200, respectively, illustrating locations of a transformation module that includes the cost evaluation system 100, in accordance with embodiments of the present invention.

In system 1100, the transformation module 1150 is located at a server 1110, or on a stand alone machine accessed and associated with server 1110. In one embodiment, the transformation module 1150 creates the transformation operations that transforms an XML document 1140 into XML document 1145. XML document 1140 corresponds to a first XML schema, and XML document 1145 corresponds to a second XML schema that server 1120 is able to understand and interpret. The transformation is necessary because server 1120 is unable to understand and interpret any XML document (e.g., document 1140) corresponding to the first XML schema. The cost evaluation system 100 is located at transformation module 1150 to evaluate a cost associated with the sequence of transformation operations used to transform XML document 1140 into XML document 1145.

Thereafter, server 1110 applies the transformation operations to XML document 1140 in order to create XML document 1145. Then, server 910 sends the XML document 1145 through a network 1130 (e.g., Internet) to server 1120. In addition, the transformation module could just as well be located at server 1120 to provide the same transformation functionality.

In system 1200, the transformation module is located at a remote server 1230, or on a stand alone machine accessed and associated with server 1230, in accordance with one embodiment of the present invention. XML document 1240 corresponds to a first XML schema that server 1210 is able to understand and interpret. XML document 1245 corresponds to a second XML schema that server 1220 is able to understand and interpret. The transformation between XML document 1240 and 1245 is necessary because server 1220 is unable to understand and interpret any XML document (e.g., document 1240) that corresponds to the first XML schema. As such, transformation module 1250 creates the transformation operations that transforms XML document 1240 into XML document 1245. Additionally, transformation module 1250 includes the cost evaluation system 100 of FIG. 1, to evaluate a cost of the transformation operations used to transform XML document 1240 into XML document 1245. In the present embodiment, server 1230 transforms XML document 1240 into XML document 1245 using transformation operations created by transformation module 1250 and then sends XML document 1245 to server 1220 over a network (e.g., Internet).

Extensible Markup Language (XML) Document Transformation

Before the implementation of the process illustrated in flow chart 200, discovery of a sequence of transformation operations is needed to transform the source XML document to the target XML document. In one embodiment, the source schema and the target schema are modeled as tree structures. By modeling the schema as tree structures, a source tree is created having a plurality of source nodes and a target tree is created having a plurality of target nodes.

The present embodiment then generates a sequence of transformation operations by matching and transforming each of the source nodes in the source tree to corresponding nodes in the target tree.

In one embodiment, the source and the target schemas are document type definition (DTD) documents. Since DTD is a dominant industry standard, the problem of transforming a document that conforms to a source DTD to a target DTD is described, in accordance with one embodiment of the present invention. A DTD describes the structure of XML documents as a list of element type declarations. An element type declaration is modeled as a tree, as illustrated in step 210, denoted as T=(N, p, l), where N is the set of nodes, p is the parent function representing the parent relationship between two nodes, and l is the labeling function representing that node's properties. A node "n" in the set of nodes N is categorized on its label l(n). The two categories of nodes in the set N are tag nodes and constraint nodes.

Although the present embodiment describes a transformation between DTD documents, embodiments of the present invention are well suited to transforming between documents with other XML schemas.

In another present embodiment, for tag nodes, the names of tag nodes appear as tags in the XML documents. Tag nodes represent XML document tags. Each element node, n, in a tag node is associated with an element type T. Its label, l(n), is a singleton in the format of [Name] where Name is T's name.

In addition, in another embodiment, each attribute node, n, in a tag node is associated with an attribute type T. Its label l(n) is a quadruple in the format of [Name, Type, Def, Val] where Name is T's name, Type is T's data type (e.g., CDATA etc.), Def is T's default property (e.g., #REQUIRED, #IMPLIED etc.), and Val is T's default or fixed value, if any.

In still another embodiment, for constraint nodes, the names of constraint nodes do not appear in the XML documents. Constraint nodes capture relationships between the tags in the XML document. There are two types of constraint nodes: list nodes and quantifier nodes.

In another embodiment, a list node represents a connector for associating other nodes to a content particle. For example, each list node, n, indicates how its children are composed, that is, by sequence (e.g., l(n)=[","]) or by choice (e.g., l(n)=["|"]).

In still another embodiment, a quantifier node in a constraint node serves as a connector that indicates the number of times a child node can occur in a parent node. For example, a quantifier node represents whether its children occur in its parent's content model one or more times (e.g., l(q)=["+"], called a "plus" quantifier node), zero or more times (e.g., l(q)=["*"], called a "star" quantifier node), or zero or one time (e.g., l(q)=["?"], called a "qmark" quantifier node).

In one embodiment, a tree rooted at a node of element type T is called T's type declaration tree. It is assumed that each DTD has a unique root element type. For example, Tables 1 and 2, as listed below, show two sample DTDs of web-service purchase orders. Table 1 is an exemplary DTD 1 describing a purchase order for web service A. Table 2 is an exemplary DTD 2 describing a purchase order for web service B.

TABLE 1

Document Type Definition (DTD) 1

<!ELEMENT company (address, cname, personnel)>
<!ATTLTST company id ID #REQUIRED>
<!ELEMENT address (street, city, state, zip)>
<!ELEMENT personnel (person)+>
<!ELEMENT person (name, email?, url?, fax+)>
<!ELEMENT family (#PCDATA)>
<!ELEMENT given (#PCDATA)>
<!ELEMENT middle (#PCDATA)>
<!ELEMENT name (family | given | middle?)*>
<!ELEMENT cname (#PCDATA)>
<!ELEMENT email (#PCDATA)>
<!ELEMENT street (#PCDATA)>
<!ELEMENT city (#PCDATA)>
<!ELEMENT state (#PCDATA)>
<!ELEMENT zip (#PCDATA)>
<!ELEMENT url (#PCDATA)>
<!ELEMENT fax (#PCDATA)>

TABLE 2

Document Type Definition (DTD) 2

<!ELEMENT company (cname, (street, city, state, postal), personnel>
<!ATTLTST company id ID #REQUIRED>
<!ELEMENT personnel (person)+>
<!ELEMENT person (name, email+, url?, fax?, fax, phonenum)>
<!ELEMENT last (#PCDATA)>
<!ELEMENT first (#PCDATA)>
<!ELEMENT name (first, last)>
<!ELEMENT cname (#PCDATA)>
<!ELENENT email (#PCDATA)>
<!ELEMENT street (#PCDATA)>
<!ELEMENT city (#PCDATA)>
<!ELEMENT state (#PCDATA)>
<!ELEMENT zip (#PCDATA)>
<!ELEMENT url (#PCDATA)>
<!ELEMENT fax (#PCDATA)>
<!ELEMENT phonenum (#PCDATA)>

Figure 3A:
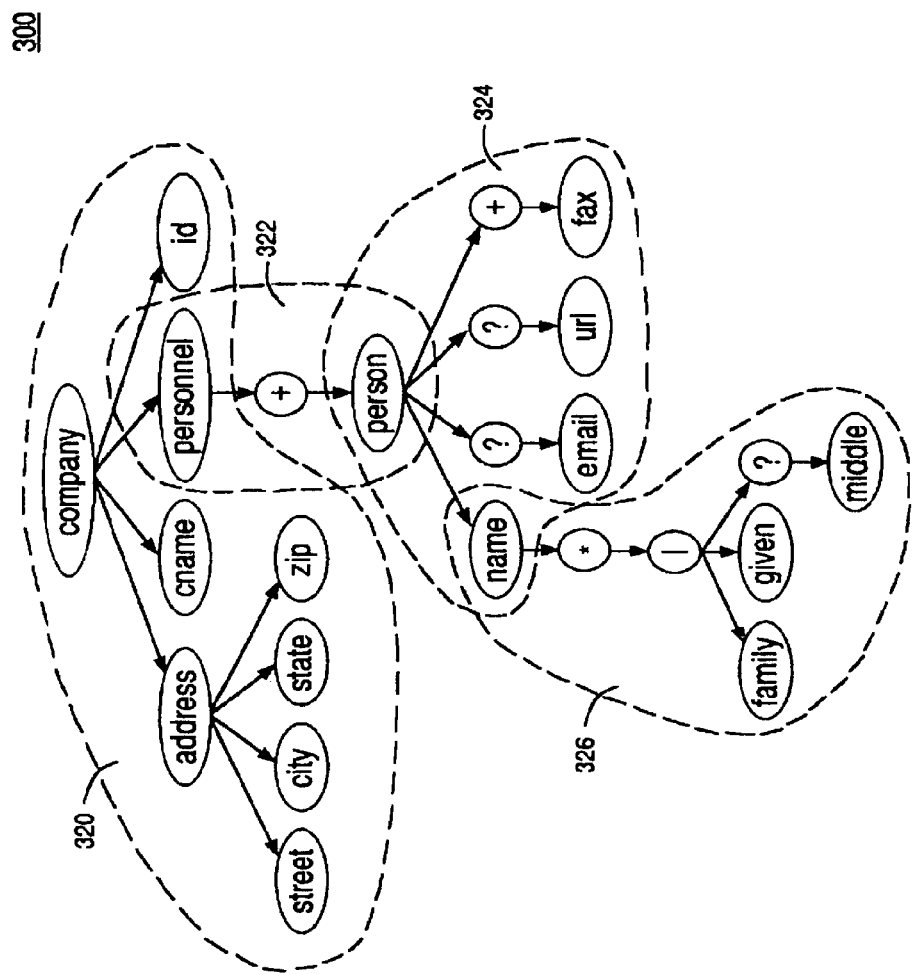
FIG. 3a is a tree diagram of the DTD schema of Table 1, in accordance with one embodiment of the present invention.
Figure 3B:
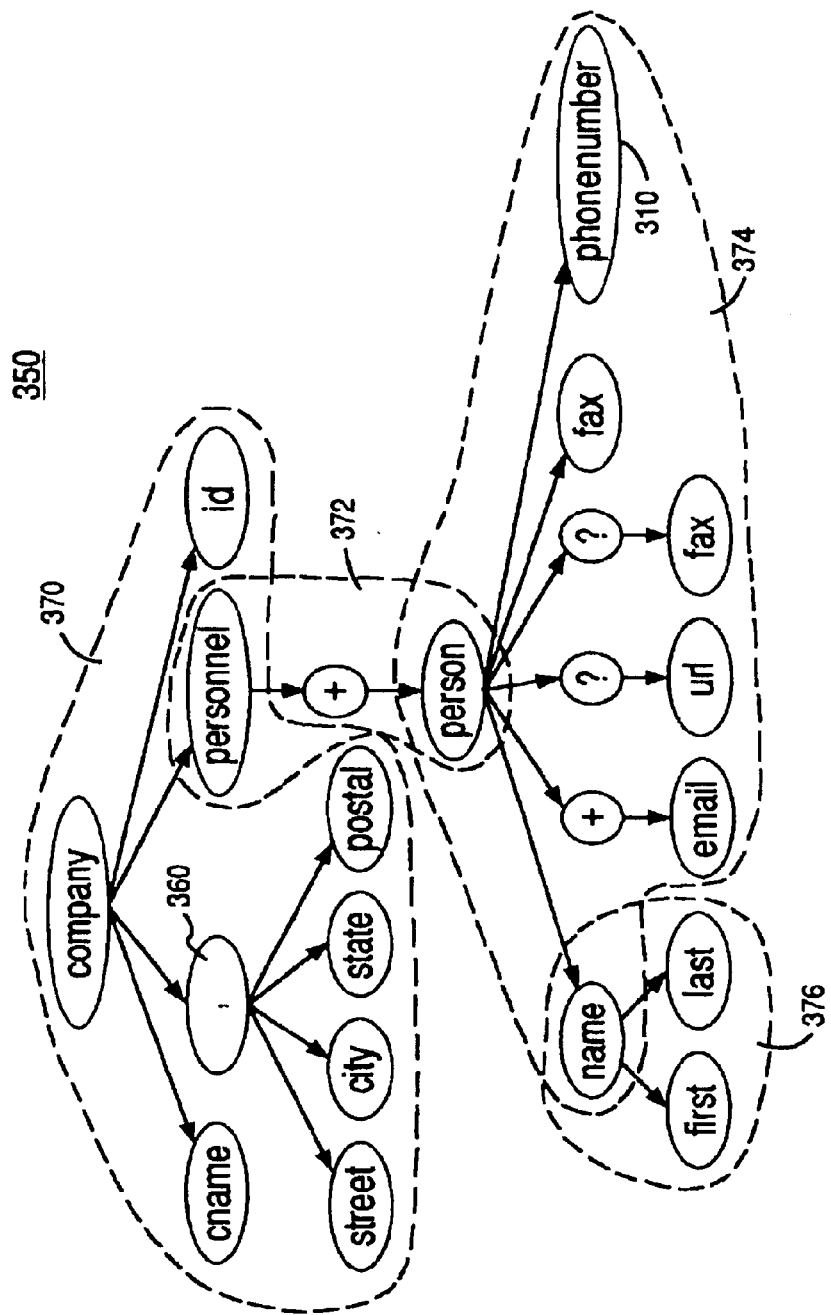
FIG. 3b is a tree diagram of the DTD schema of Table 2, in accordance with one embodiment of the present invention.

FIGS. 3*a* and 3*b* are diagrams modeling the purchase orders of Tables 1 and 2, respectively, as DTD trees, in accordance with one embodiment of the present invention. FIG. 3*a* illustrates a DTD tree 300 of DTD 1 in Table 1 having various nodes. FIG. 3*b* illustrates a DTD tree 350 of DTD 2 in Table 2 having various nodes. For simplicity, in FIGS. 3*a* and 3*b*, each node is marked with its name rather than a complete label. Since each element type declaration is composed of a list of content particles enclosed in parentheses (optionally followed by a quantifier), the outermost parenthesis construct is not modeled as a sequence list node in the DTD trees. Throughout the body of this Specification, each node is referenced by its name n with a subscript i indicating the number of the DTD it is within, i.e., $<n>_i$.

Taxonomy of the Transformation Operations

Two primary causes of discrepancies between the components of DTDs modeling the same concepts are identified, in accordance with one embodiment of the present invention. First, the properties of the concepts may differ. For example, phone number in node 310 is required as contact information in DTD 350 of FIG. 3b, while it is not required in DTD 300 of FIG. 3a. Second, due to the relatively freeform nature of XML (and lack of standards for DTD design), a given concept can be modeled in a variety ways. For example, an atomic property can be represented as either a #PCDATA sub-element or an attribute.

A set of transformation operations, listed below incorporates common DTD design behaviors, in accordance with one embodiment of the present invention, and are listed below:

1. Add(T, n): Add a new content particle (subtree) T to n's content model.
2. Insert(n, p, C): Insert a new node, n, under node p with n a quantifier node or a sequence list node and move a subset of p's children, C, to become n's children. If n is a quantifier node, change the occurrence property of the children C in p's content model from "exactly once" to correspond to n. If n is a sequence list node, put the nodes C in a group.
3. Delete(T): Delete subtree T. (Delete a content particle T from a content model.) This is the reverse operation of add.
4. Remove(n): Remove node n with n a quantifier or a sequence list node. All of n's children now become p(n)'s children. This is the reverse operation of insert.
5. Relabel(n, l, l'): Change node n's original label l to l'. The relabeling falls into the two categories as listed below:
   relabel within the same type (does not change the node's type): (a) Renaming between two element nodes, two attribute nodes or two quantifier nodes, but not between a sequence list node and a choice list node; and (b) Conversion between an attribute's default type Required and Implied.
   relabel across different types (changes the node's type): (a) Conversion between a sequence list node and an element node which has children. This corresponds to using a group or encapsulating the group into a new element type. For example, we encapsulate a group composed of street, city, state and zip into element type "address" in node 360 in FIG. 3b. (b) Conversion between an attribute node with type CDATA, default type #REQUIRED, no default or fixed value and a #PCDATA element node; (c) Conversion between an attribute node of default property #IMPLIED and a #PCDATA element node with a qmark quantifier parent node.
6. Unfold (T, $<T_1, T_2, \ldots, T_i>$): Replace subtree T with a sequence of subtrees $T_1, T_2, \ldots, T_i$. T must root at a repeatable quantifier node. $T_1, T_2, \ldots,$ and $T_i$ satisfy that: (1) they are adjacent siblings; and (2) they or their subtrees without a qmark quantifier root node are isomorphic. Unfold recasts a repeatable content particle as a sequence of non-repeatable content particles. For example, <!ELEMENTstudent(phone+)> unfolds to <ELEMENTstudent(phone?, phone)> or <ELEMENTstudent(phone, phone)>.
7. Fold(<T, $<T_1, T_2, \ldots, T_i>$, T): This is the reverse operation of unfold.
8. Split(s1, <t1, t2>): a sequence list node s1 is split into star quantifier node t1 and a choice list node t2. Because there is no DTD operator to create unordered sequences, tuples <a, b> tend to be expressed using the construct (a|b)* rather than (a,b)|(b,a). This operation corresponds to converting an ordered sequence to an unordered one. For example, (a, b) is split to (a|b)*.
9. Merge(<s1, s2>, t1): s1 and s2 are merged into a single node t1 with t1 a star quantifier node, t2 a choice list node, and n3 a sequence list node. This is the reverse operation of split.

Constraints on the Transformation Operations

While atomic operations reflect intuitive transformations, some combinations of operations may result in non-intuitive transformations, in accordance with one embodiment of the present invention. For example, suppose DTD tree 300 of FIG. 3a contained an element declaration: <!ELEMENT company (name,address,webpage)>, and DTD tree 350 contained a corresponding declaration: <!ELEMENT company (CEO,webpage)> <!Element CEO (name,address)>. The DTD tree can be derived from DTD tree 300 by first inserting a sequence list node above name and address, and then relabeling the sequence list node to tag node CEO. This is equivalent to the forbidden operation of inserting a tag node CEO above name and address.

Common design patterns show that an element type declaration will not be deeply nested, in accordance with one embodiment of the present invention. Typically, the maximum depth of an element type's declaration tree is typically around 2 or 3. The average depth is even lower. According to this design pattern, if a node $n_1$ has a matching partner $n_2$, it is highly likely that $n_1$ and $n_2$ have a similar depth in the subtrees rooted at their nearest matching ancestors in the DTD trees. Therefore, scripts are only changed in one embodiment that do not violate the following constraint: that a node cannot be operated on directly more than once, with the following exceptions: (1) unfold following or followed by relabel; and (2) relabel performed between an attribute and an element following or followed by deletion or addition of qmark quantifier node.

Cost Model

In a sequence of operations, each of a plurality of costs is calculated to determine a cost of transforming between nodes in the source and target schemas, in accordance with one embodiment of the present invention. Each of the plurality of costs is associated with transforming a source node in a source tree, that corresponds with the source XML schema, to a matched target node, in a target tree that corresponds with the target XML schema. In one embodiment, each of the plurality of costs is calculated automatically when transforming from one XML schema to another XML schema.

The present embodiment then combines each of the plurality of costs to calculate the transformation cost for a sequence of transformation operations. This transformation cost evaluates the total transformation cost of transforming the source XML schema to a target XML schema. In one embodiment, the transformation cost is combined and calculated automatically. In another embodiment, a summation of each of the plurality of costs is performed to calculate the total transformation cost.

A cost model is used to calculate each of the plurality of costs, as described above, and the total transformation cost. The cost model incorporates the characteristics of the domain of transforming XML schemas. For example, the cost model reflects heuristics in the domain of the translation of XML documents. In one embodiment, intuitions regarding the cost model include: 1) information loss is expensive; and 2) the closer the amount of data included within the schema created after translation is to the source schema, the cheaper the transformation. By evaluating the transformation cost between a variety of equivalent transformation scripts, an optimal sequence of transformations can be chosen that best captures the semantic relationship between the source XML schema and the target XML schema.

These transformation operations can be combined into a variety of equivalent transformation scripts. In order to facilitate selection among alternative transformations, a cost model evaluates the cost of transformation operations in terms of their impact on the data capacity of the document schemas, in accordance with one embodiment of the present invention. Relative information capacity measures the semantic connection between database schemas. For example, two schemas are considered equivalent if and only if there is a one-to-one mapping between a data instance in the source and the target schema. The data capacity of an XML document is the collection of all of its data. In addition, it is assumed that the DTDs are flat, such that, no schema information (e.g., element or attribute's names in one DTD) are stored as PCDATA or attributes' values in an XML document conforming to another DTD. Hence, only PCDATA and attribute values are considered in XML documents as data.

The concept of "data capacity gap," as previously introduced, is the measurement of the data loss, or, alternatively, the preservation of source data, when transforming between a source XML document to a target XML document, in one embodiment of the present invention. Since data is defined as PCDATA and attribute values in the XML document, a change in data may occur when transforming from a source XML schema to a target XML schema. An operation may require the addition of data, the removal of data, or the preservation of data.

Figure 6:
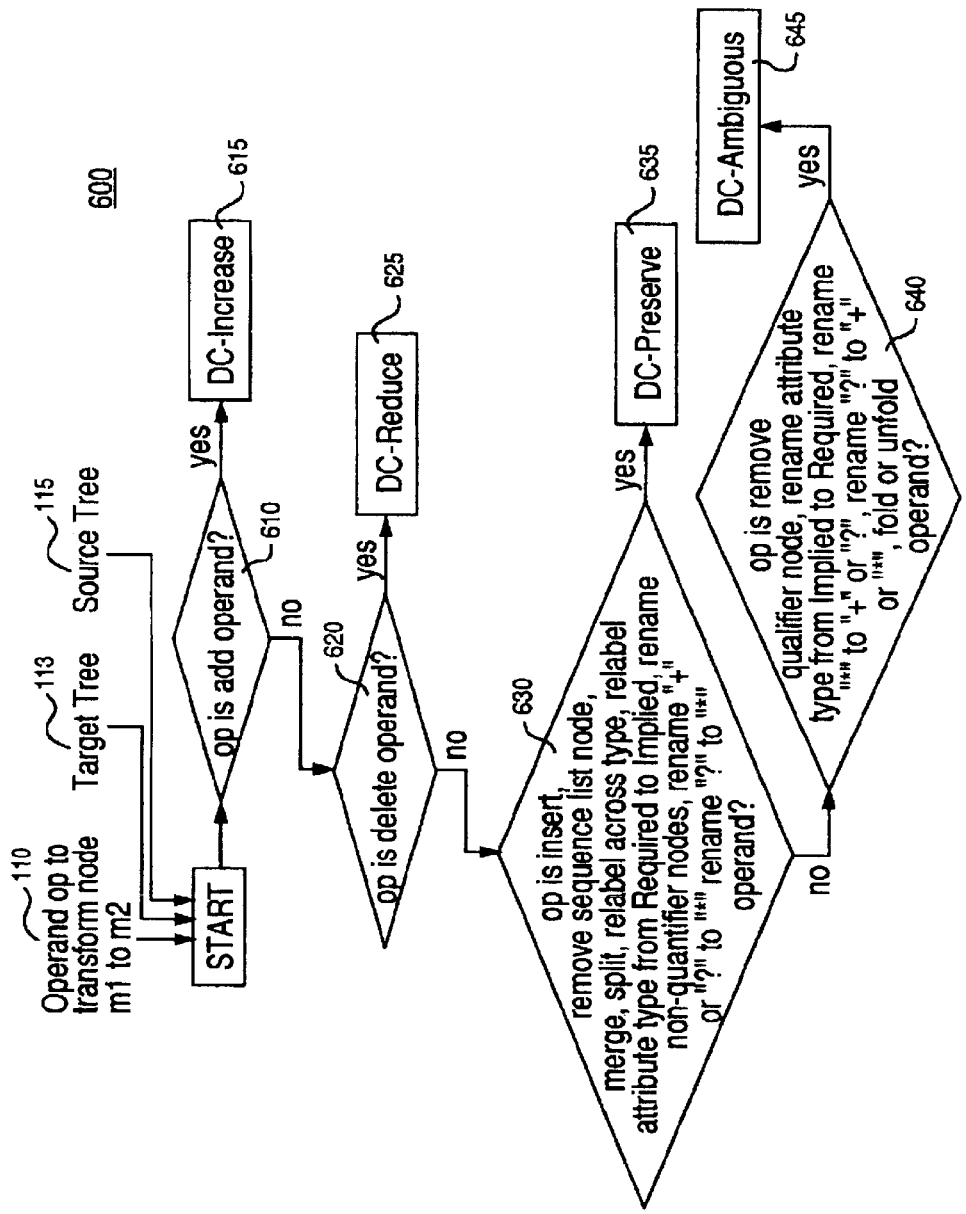
FIG. 6 is a flow chart illustrating steps in a method for characterizing operations, in accordance with one embodiment of the present invention.

FIG. 6 is a flow chart 600 illustrating steps in a method for characterizing operations according to whether they require the addition of data, the removal of data, or the preservation of data, in accordance with one embodiment of the present invention. The present embodiment analyses the operand 103 that transforms node $m_1$ in source tree 107 to node $m_2$ in target tree 105. Flow chart 600 can be the method implemented in the data capacity measurement module 110 of FIG. 1 for measuring data capacity gap.

In decision step 610, the present embodiment determines if the operand 103 results in the addition of data, e.g., an add operand. Transformation operations that result in the addition of data are characterized as data capacity increasing (DC-Increase) in step 615.

If the operand 103 is not an add operand, the present embodiment determines if the operand 103 results in the loss of data, e.g., a deletion or merging of data, in decision step 620. Transformation operations that result in the deletion or merging of data (e.g., delete or merge operands) are characterized as data capacity reducing (DC-Reduce), in step 625.

The data capacity increasing (DC-Increase) operations, and data capacity preserving (DC-Preserve) are examples of data capacity gap. Returning to flow chart 600, if the operand 103 is not does not result in the loss of data, the present embodiment proceeds to step 630. In decision step 630, the present embodiment determines if the operand preserves data. Transformation operations that result in the preservation of data (e.g., insert) are characterized as data capacity preserving, in step 635.

If the operand 103 does not preserve data, the present embodiment proceeds to step 640. For some operations, it is difficult to determine from the DTDs alone whether the transformation will result in the loss, addition, or preservation of data capacity. For example, the operation remove quantifier node <"*"> changes the content particle from non-required to required which may cause an increase in data. The operation also changes the content particle from repeatable to non-repeatable which may cause data reduction. These transformations are characterized data capacity ambiguous (DC-Ambiguous), in step 645. The term, DC(op) is used to denote this cost.

Due to the heuristics that information loss is expensive, such that, the reconstruction of source XML schema is not complete, the cost of the transformation operations can be ordered in the following manner: DC-preserve having a higher cost than DC-increase, DC-increase having a higher cost than DC-ambiguous, and DC-ambiguous having a higher cost than DC-reduce. For a particular operation, the cost related to data capacity gap is denoted by the term, DC(op). Tables 3 and 4 illustrate the category that each operand for transformation is associated with.

TABLE 3

Operation's property of data capacity change.

| Operation | Type of Data Capacity Change |
| --- | --- |
| add | DC-Increase |
| delete | DC-Reduce |
| insert | DC-Preserve |
| remove sequence list node | DC-Preserve |
| remove quantifier node | DC-Ambiguous |
| fold | DC-Preserve |
| unfold | DC-Ambiguous |
| merge | DC-Reduce |
| split | DC-Preserve |
| relabel across type | DC-Preserve |

TABLE 4

Operation relabel within the same type.

| Operation | Type of Data Capacity Change |
| --- | --- |
| rename | DC-Preserve |
| relabel attribute type from Required to Implied | DC-Preserve |
| relabel attribute type from Implied to Required | DC-Ambiguous |
| rename "*" to "+" | DC-Ambiguous |
| rename "*" to "?" | DC-Ambiguous |
| rename "+" to "*" | DC-Preserve |
| rename "+" to "?" | DC-Ambiguous |
| rename "?" to "*" | DC-Preserve |
| rename "?" to "+" | DC-Ambiguous |

Although some transformations are data capacity preserving, there may still be a potential data capacity gap between a document conforming to the source DTD and one conforming to the target DTD. For example, the operation insert a quantifer node <"+"> is a DC-Preserve transformation. Specifically, it changes the children content particles' occurrence property from non-repeatable to repeatable and then allows the XML documents to accommodate more data in the future. The term, potential data capacity gap PDC(op), is used to denote this cost for an operation.

Figure 7:
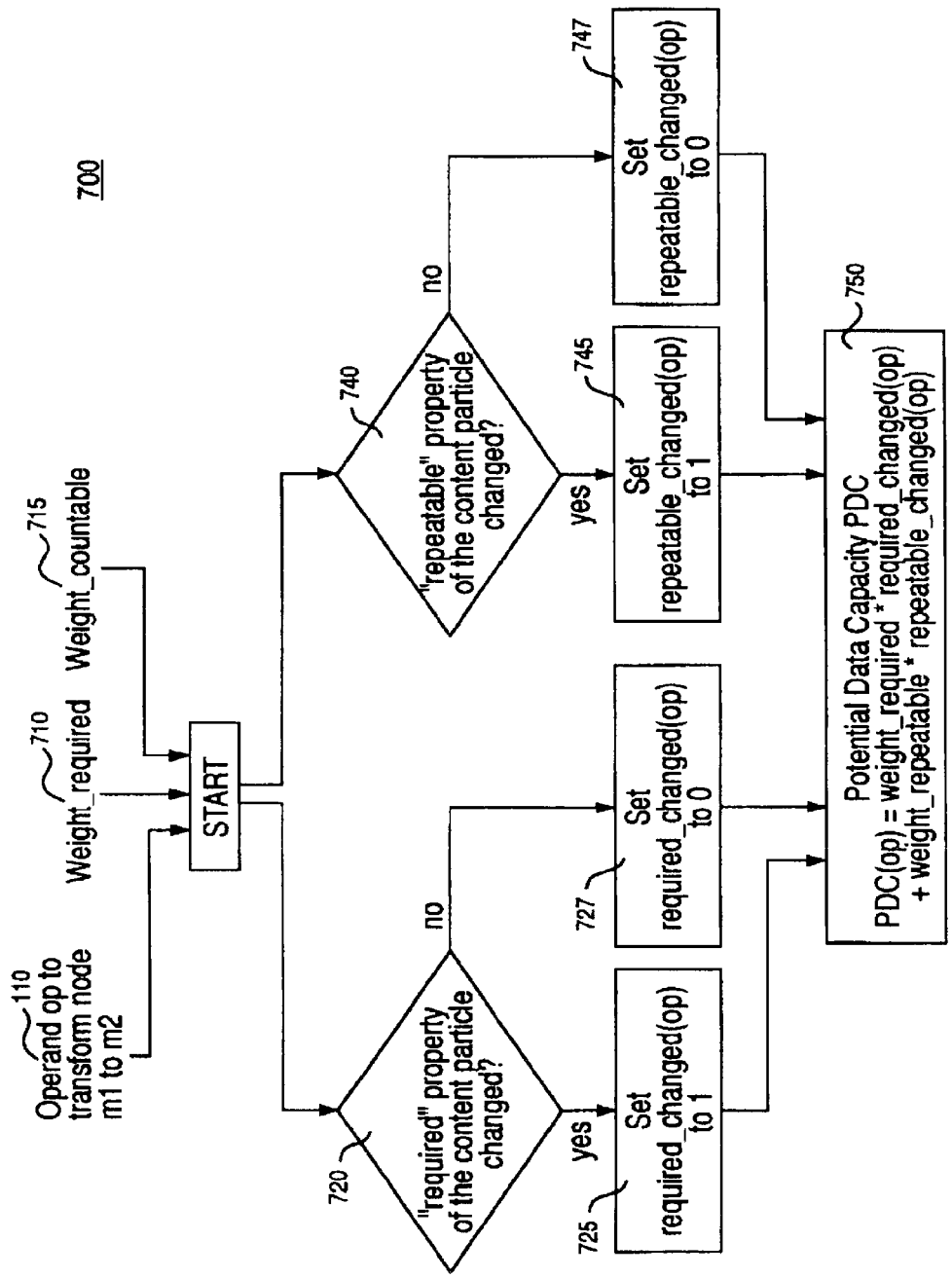
FIG. 7 is a flow chart illustrating steps in a method for calculating the data capacity gap of a transformation operation, in accordance with one embodiment of the present invention.

The flow chart 700 in FIG. 7 illustrates steps in a method for calculating the data capacity gap, in accordance with one embodiment of the present invention. The method in flow chart 700 can be implemented by potential data capacity measurement module 130 of FIG. 1 to determine the potential of data loss.

The present embodiment examines the operand 110 to determine the potential data loss. Weights $W_{required}$ 710 and $W_{repeatable}$ 715 indicate the importance of the change of the corresponding property to the potential data capacity. The required changed(op) and repeatable changed(op) are two boolean functions that indicate whether the properties "required" or "repeatable" of the content particles that are operated on by op are changed or not.

In step 720, the present embodiment examines the required property of the content particle to determine if it was changed by operand 110. If changed, the present embodiment sets the boolean function, required changed (op), to the value of 1, in step 725. If not changed, the present embodiment sets the boolean function, required changed(op), to a value of 0, in step 727.

In step 740, the present embodiment examines the repeatable property of the content particle to determine if it was changed by operand 110. If changed, the present embodiment sets the boolean function, repeatable changed(op), to a value of 1, in step 745. If not changed, the present embodiment sets the boolean function, repeatable changed(op), to a value of 0, in step 747.

In step 750, the potential data capacity gap is measured. A definition can be formed expressing the potential data capacity gap: PDC(op)=$W_{required}$*required_changed(op)+$W_{repeatable}$*repeatable changed(op), in accordance with one embodiment of the present invention. By inputting the proper variables, a potential data capacity gap value is determined.

The number, size or property of operands involved in an operation may impact the data capacity, or, the potential data capacity gap, in accordance with one embodiment of the present invention. The operand factor, Fac(op), is used to denote this cost. For instance, the operation of merging a smaller set of non-repeatable content particles to a repeatable content particle causes a greater potential data gap than that of merging a larger set. In another example, when relabelling occurs between two tag nodes, or if their names are synonyms, there is limited potential data gap, and Fac(op) is 0. If no knowledge about the two names' relationship is available, Fac(op) is then proportional to their name strings' similarity.

Figure 8:
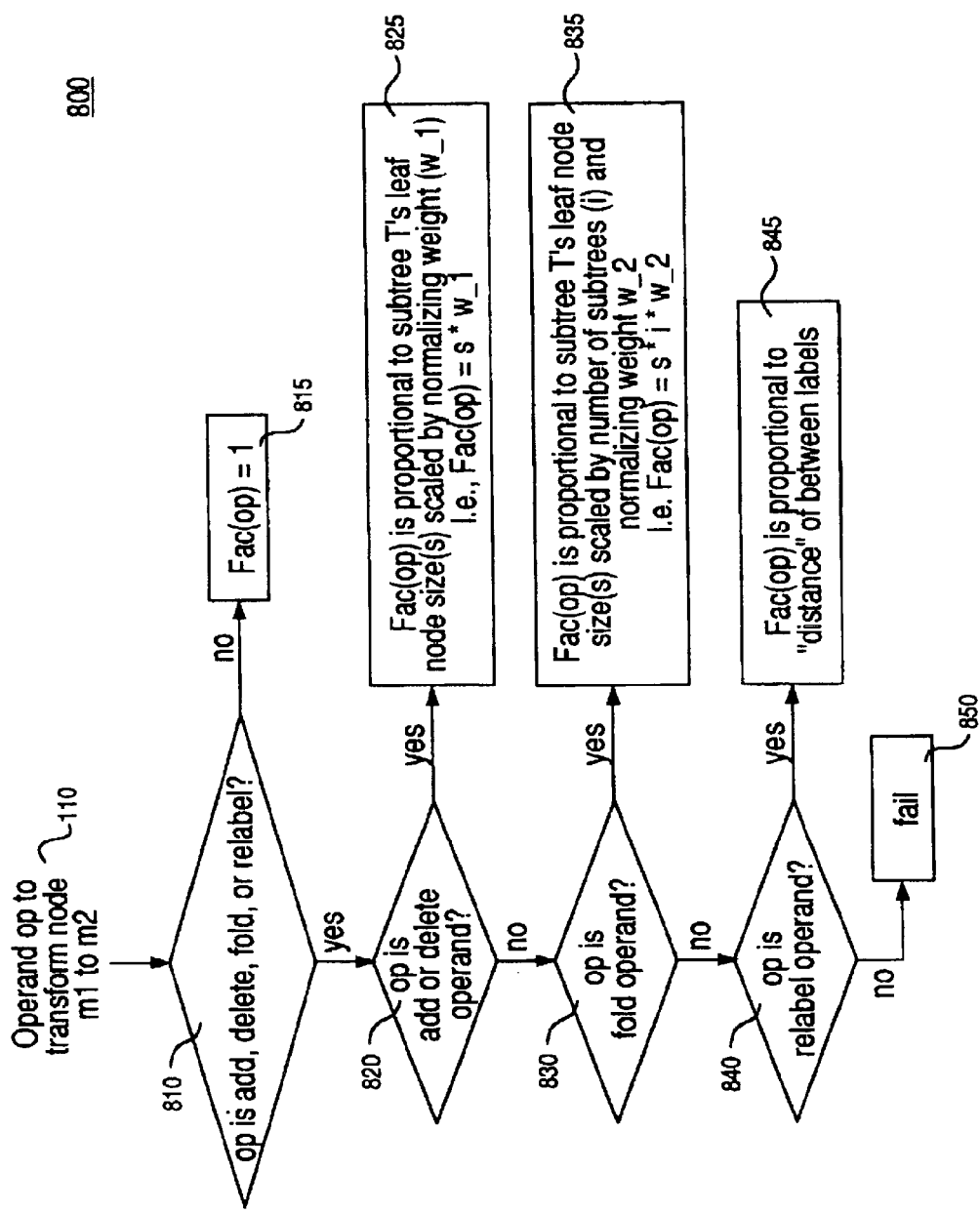
FIG. 8 is a flow chart illustrating steps in a method for scaling the impact of operands, in accordance with one embodiment of the present invention.

The flow chart 800 in FIG. 8 illustrates steps in a method for scaling the impact of the operand 110 on the data capacity gap or potential data capacity gap, in accordance with one embodiment of the present invention. In decision step 810, the present embodiment determines if the operand is an add, delete, fold, or relabel transformation operation. If not, then the scaling effect (Fac(op)) is minimal, and Fac(op) is set to the value 1, in step 815. If not, the present embodiment proceeds to step 820.

In step 820, the present embodiment determines if the operand 110 is an add or delete operand. If yes, then the scaling effect is proportional to the size of the number of leaves in the subtree that is operated on, and is set accordingly in step 825. If not, then the present embodiment proceeds to step 830.

In step 830, the present embodiment determines if the operand 110 is a fold operand. If yes, then the scaling effect is proportional to the size of the leaf nodes in a subtree that is operated on scaled by the total number of subtrees, and a normalizing weight factor, and is set accordingly in step 835. If not, then the present embodiment proceeds to step 840.

In step 840, the present embodiment determines if the operand 110 is a relabel operand. If yes, then the scaling effect is proportional to the distance of two labels. For example, while relabeling occurs between two tag nodes, if their names are synonyms (where the synonym knowledge are provided by the user), then Fac(op) is set to 0. If no knowledge about the two names' relationship is available, Fac(op) is then proportional to their name strings' similarity. Otherwise, the process in flow chart 800 fails in step 850.

Using the previously defined data capacity gap, potential data capacity gap, and scaling effect values, a transformation cost relationship is established as follows, in accordance with one embodiment of the present invention:

$$Cost(op)=(DC(op)+PDC(op))*Fac(op).$$

In an example using the DTD trees of FIGS. 3a (tree 300) and 3b (tree 350), the cost model is used to choose a matching plan from multiple candidates, in one embodiment. The following settings are chosen: DC-Preserve=0.6, DC-Increase=0.8, DC-Ambiguous=0.9, and DC-Reduce=1.0. Also Fac(op) for an operation or operand op of relabeling between an element node and a sequence list node is 3, and the scaling factor for relabeling between two synonym element nodes is 0. For an operation op that adds a subtree, the Fac(op) is proportional to the number I of subtree's leaf nodes. Assuming k=1, then Fac(op)=k*i.

In transforming between tree 300 and tree 350, looking at the subtree rooted at $<,>_{300}$, there are two options to derive that subroot. The first option is to match $<address>_{300}$ to $<,>_{350}$. This entails relabeling $<address>_{300}$ from [adddress] to [,], and relabeling $<zip>_{300}$ from [zip] to [postal]. The second option is to add a new subtree which is the one finally rooted at $<,>_{350}$.

For the first operation, the cost of the first relabel is as follows: (DC(op)+PDC(op))*FAC(op)=(0.6+0)*3=1.8. The cost of the second relabeling operation is as follows: : (DC(op)+PDC(op))*FAC(op)=(0.6+0)*0=0. The total cost of the first option is 1.8+0=1.8. For the second option, the cost is (DC(op)+PDC(op))*FAC(op)=(1.0+0)*4=4. In this case, the first option is preferable due to its lower cost.

However, supposing that $<address>_{300}$ only has one single child node $<postal>_{300}$, the first option would have three additional operations, as follows: add $<street>_{350}$, $<city>_{350}$, and $<state>_{350}$. These three additional operations would cost (0.8+0)*1=0.8 each. the total cost of the first option is therefore (1.8+0.8)*3=4.2. This time the first option is not preferable since it is more expensive than the second option.

Generation of Simplified Element Tree Matches

In one embodiment, the domain of business documents that are exchanged between services shares a common ontology. Name similarity is used as the first heuristic indicator of a possible semantic relationship between two tag nodes. For example, in FIGS. 3a and 3b, each document root has a child node named personnel, so without looking at their descendants, these two nodes can be matched.

Further, the matching between the descendants of two personnel nodes are matched by comparing the two personnel's type declaration trees separately. However suppose in DTD 350 of FIG. 3b, people were used instead of personnel and no synonym knowledge was given. It would be necessary to then look further at the descendants of personnel and people to decide whether to match them.

In order to represent the semantic relationships between two XML documents, a simplified element tree is introduced, which is designed to capture the relationship between specific elements of the two documents, in accordance with one embodiment of the present invention. When two DTDs are provided, a tag node is non-renameable if there exists any tag in the other DTD whose name is the same or a synonym.

A simplified element tree of element type E, denoted as ST(E), is a subtree of T's type declaration tree T(E) that roots at T(E)'s root with each branch ending at the first non-rename-able node reached. In FIGS. 3a and 3b, the four subtrees within the dashed lines are simplified element trees of company, personnel, person and name in the two DTDs 300 and 350, respectively. For example, FIG. 3a shows the following subtrees: company 320, personnel 322, person 324, and name 326. In FIG. 3b, the subtrees are designated as follows: company 370, personnel 372, person 374, and name 376.

Each name-match node can be associated with some cost factor. For example, the cost factor may indicate the "confidence" or "accuracy" of the match. The name-match nodes, combined with factors, can be used to reason about the simplified element tree in an abstract manner.

Figure 9:
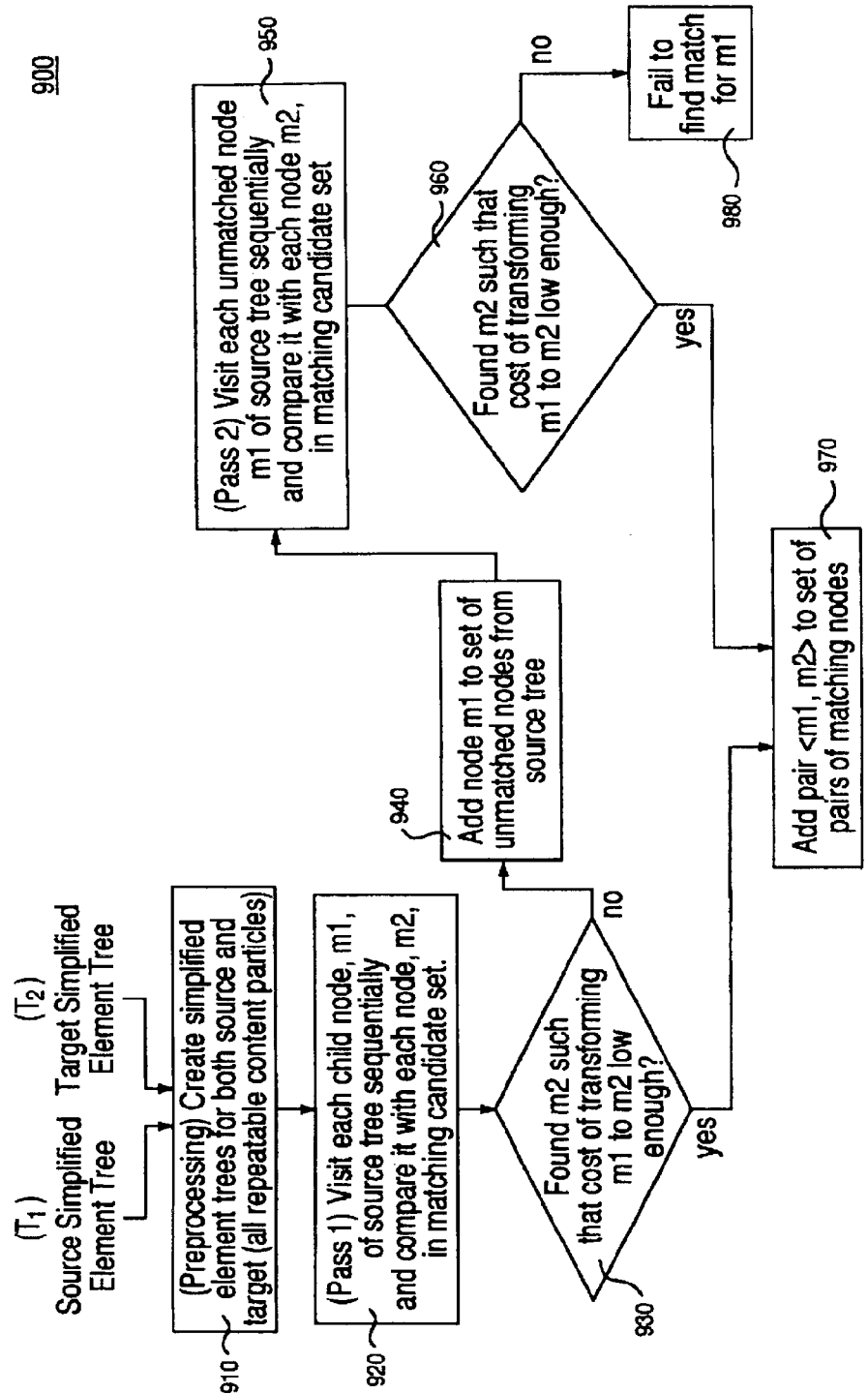
FIG. 9 is a flow diagram illustrating steps in a method for matching nodes between a source tree and a target tree, in accordance with one embodiment of the present invention.

FIG. 9 is a flow chart 900 of steps in a method for matching nodes between two XML DTDs. In one embodiment, an XML-structure-specific tree matching process matches nodes between two XML DTDs. The process is hereinafter referred to as the matchPropagate process. The general unordered tree matching problem is a notoriously high complexity non-polynomial (NP) problem. The typical assumption about relabelling does not hold in XML document matching, and thus those techniques do not apply. The matchPropagate tree matching process incorporates the domain characteristics of specific DTD tree transformation operations and the imposed constraints.

Given a source simplified element tree, $T_1$, and a target simplified element tree, $T_2$, nodes in $T_1$ are called source nodes, and nodes in $T_2$ are called target nodes, in one embodiment as illustrated in FIG. 9. If $n_1$ and $n_2$ are a source and a target node, respectively, the matchPropagate process discovers a sequence of operations that transforms the subtree rooted at $n_1$ to the subtree rooted at $n_2$. The cost of the script is then the cost of matching $n_1$ and $n_2$.

The matchPropagate process is composed of two phases, in accordance with one embodiment of the present invention. The first phase is the preprocessing phase of step 910. In step 910, the present embodiment creates two special nodes, namely, $\Phi_1$, mapped to deleted nodes and $\Phi_2$, mapped to removed nodes. Hence the operations add, insert, delete, remove and relabel set up a one-to-one mapping relationship. On the other hand, the operations unfold, fold, split and merge set up a one-to-many relationship. For example, unfold maps one subtree to multiple subtrees, split maps two nodes (a star quantifier and a choice list node) to a sequence list node. In order to make the matching discovery process for each node uniform, the simplified element trees are pre-processed.

Figure 4A:
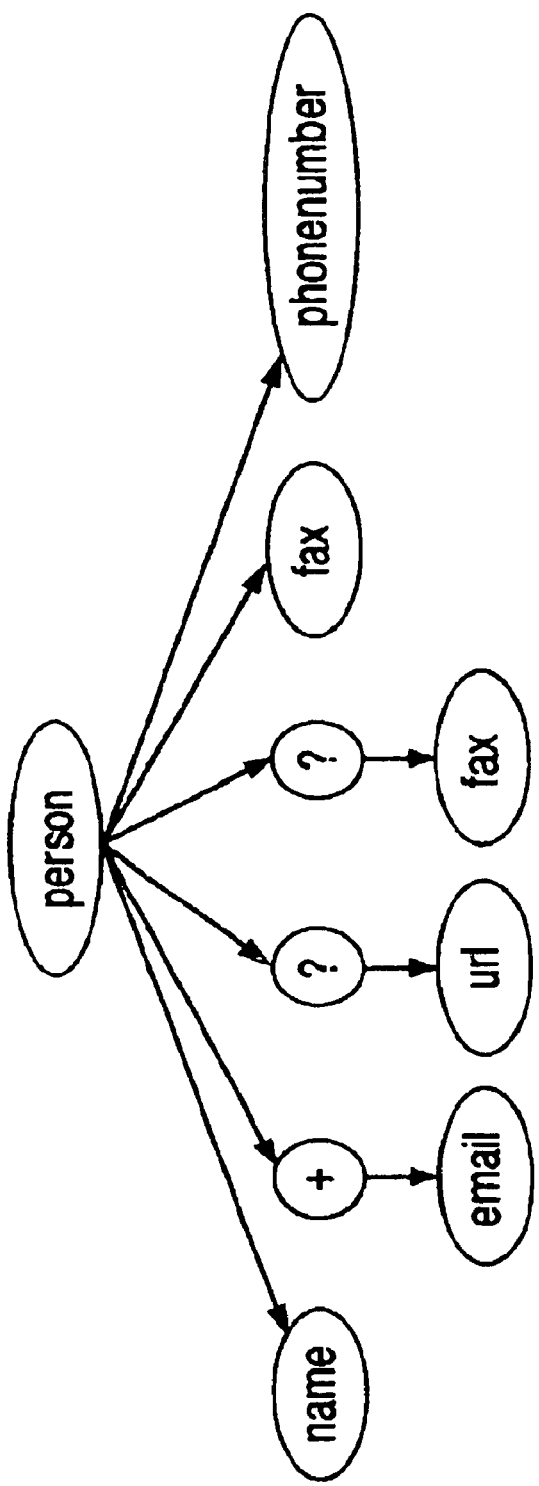
FIG. 4a is a partial subtree diagram of the DTD schema of FIG. 3b, in accordance with various embodiments of the present invention.
Figure 4B:
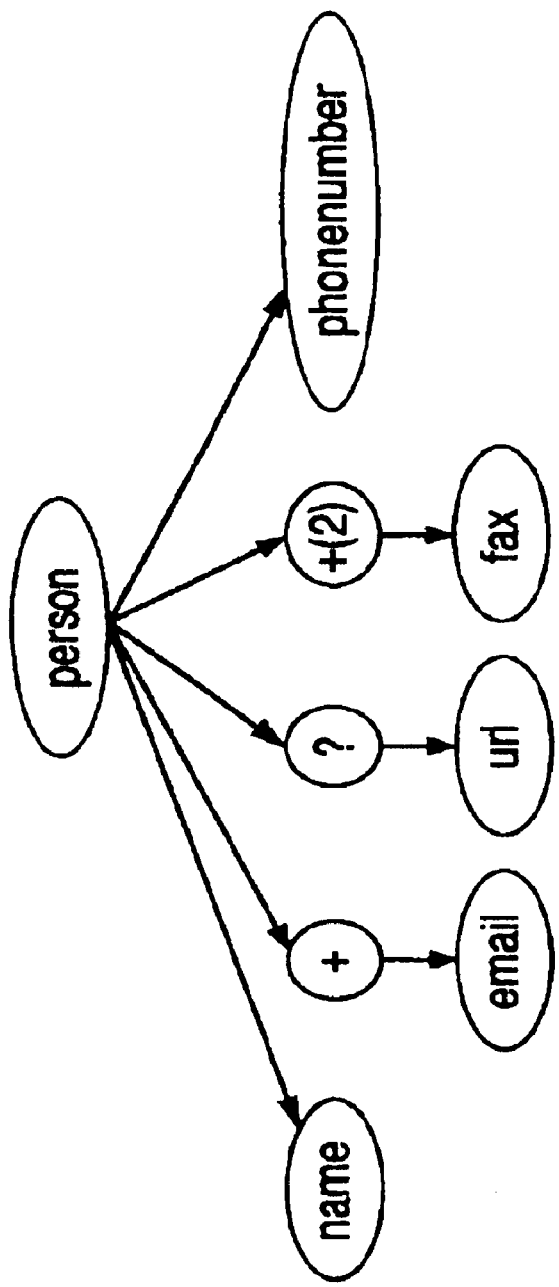
FIG. 4b is a partial subtree diagram of the DTD schema of FIG. 3b, in accordance with one embodiment of the present invention.

In the preprocessing phase of step 910, fold operations are first performed. For example, FIGS. 4a and 4b illustrate a fold operation on the subtree 374 of FIG. 3b. The subtree 374 illustrated in FIG. 4a will be converted to subtree 474 of FIG. 4b. The plus quantifier node will be marked with a number (2) indicating the maximum occurrence of content particle fax.

Figure 5A:
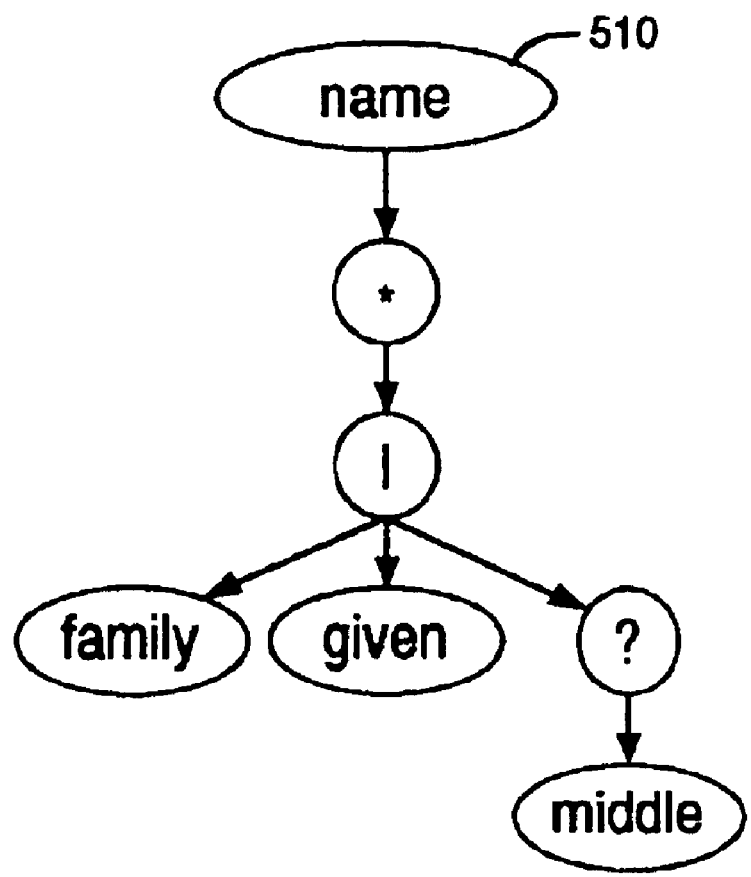
FIG. 5a is a partial subtree diagram of the DTD schema of FIG. 3a, in accordance with one embodiment of the present invention.
Figure 5B:
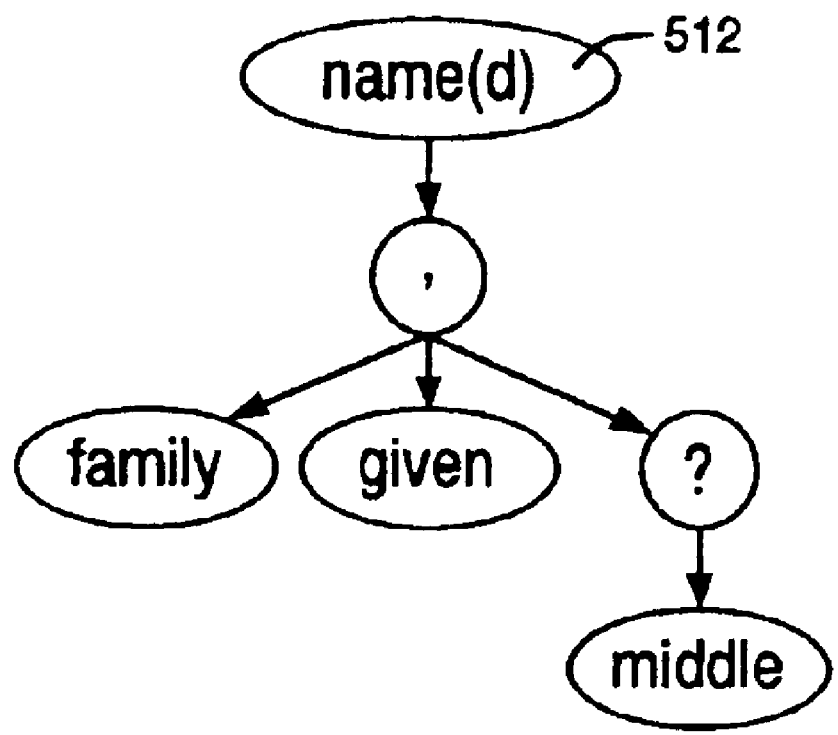
FIG. 5b is a partial subtree diagram of the DTD schema of FIG. 3a, in accordance with one embodiment of the present invention.
Figure 5C:
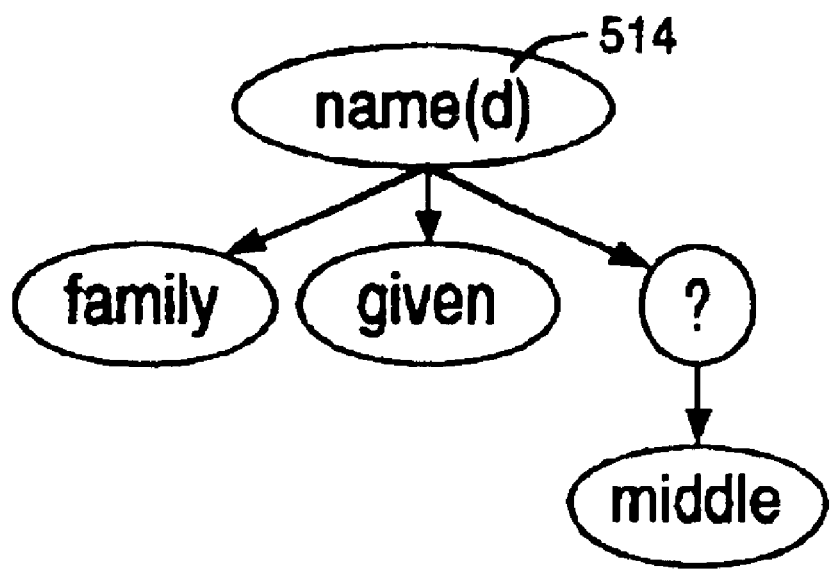
FIG. 5c is a partial subtree diagram of the DTD schema of FIG. 3a, in accordance with one embodiment of the present invention.

The merge operations are performed second. For example, FIGS. 5a, 5b, and 5c illustrate a merge operation on the subtree 326 of FIG. 3a. The subtree 326 of FIG. 5a is converted to the subtree 526b of FIG. 5b first. Since the outermost sequence list construct is always ignored and by default implied, subtree 526b of FIG. 5b will be converted to subtree 526c FIG. 5c. The name node 510 is marked with a letter d in name nodes 512 and 514 to indicate that the arbitrary order flexibility has been dropped.

In the second phase, one-to-one node mappings are found, in one embodiment. To derive the transformation from the subtree rooted at $n_1$ and the subtree rooted at $n_2$, for each child $m_1$ of $n_1$, an attempt is made to find a matching partner $m_2$ (a matching partner can be one of the special nodes $\Phi_1$ or $\Phi_2$). This matching discovery is done in two passes, or two matching iterations.

The present embodiment selects a plurality of candidate nodes in the target schema that are possible matches for each of the source nodes in the source schema.

In the first pass, each child $m_1$ of $n_1$ is visited sequentially and compared against a certain set of target nodes, the plurality of candidate nodes, in step 920 of flow chart 900. The set of nodes that will be compared with the current source node is termed, matching candidate set (S). A plurality of node transformation sequences is generated. Each of the plurality of node transformation sequences transforms the particular source node to one of the plurality of candidate nodes.

Since the constraint that a node cannot be directly operated on more than once applies, $m_1$'s matching partner $m_2$ can only be on the same level as $m_1$ (e.g., no operation or relabel operated on $m_1$) or one level deeper than $m_1$ (e.g., insert operated on $m_1$) or a special node (e.g., delete or remove operated on $m_1$), in accordance with one embodiment. By recursively applying the matchPropagate process to $m_1$ and each node s in S, a node k can be found with the least matching cost c, that is based on an information capacity cost criteria. The matching cost c is essentially a cost or measurement of lost data. A control strategy determines whether to match the node $m_1$ with k. Application of the control strategy determines if the selected node k satisfies a loss of data cost criteria that is the information capacity cost criteria, as implemented in step 930 of flow chart 900.

If a match is found between $m_1$ and $m_2$ of the target tree, then the pair ($m_1$, $m_2$) is added to the pair of matching nodes in step 970.

In the first pass, control strategy that is a delay-match scheme is applied which disallows matching $m_1$ to k if c is not low enough (i.e., c is not less than the cost of deleting $m_1$). This is illustrated in step 940, where the node $m_1$ is added to a set of unmatched nodes from the source tree.

After visiting all children of $n_1$, the present embodiment begins the second pass, in step 950. In step 950, the present embodiment visits each unmatched node $m_1$ of the source tree sequentially and compares it with each node $m_2$ in a matching candidate set, as discussed previously.

In step 960, the present embodiment traverses all unmatched children of $n_1$ again, and compares them against possible candidates. Again, the matchPropagate process is applied to $m_1$ and each node s in the set S in order to find the node k with the least matching cost c. Now a must-match scheme is applied in the second pass. This is in contrast to the delay-match scheme applied in the first pass. The node $m_1$ would be matched to k if c is less than the cost of deleting $m_1$ and adding k.

If no match is found between $m_1$ and $m_2$, then, the present embodiment fails to match that particular node in step 980. On the other hand, if a match is found between $m_1$ and $m_2$ of the target tree, then the pair $(m_1, m_2)$ is added to the pair of matching nodes in step 970.

Table 500, illustrated below illustrates the matching candidate set, S, in the first pass, in one example. Table 600 illustrates the matching candidate set, S, in the second pass, for the same example.

TABLE 500

| Source | Matching Candidate Set |
| --- | --- |
| element | element node on the same level. |
| attribute | attribute node on the same level. |
| choice | choice node on the same level |
| sequence | sequence node on the same level or one level deeper; $\Phi_1$. |
| quantifier | quantifier node on the same level or one level deeper; $\Phi$. |

TABLE 600

| Source | Matching Candidate Set |
| --- | --- |
| element | element node on the same level. |
| | sequence node on the same level; |
| | attribute node on the same level. |
| attribute | element node on the same level. |
| choice | choice node on the same level or one deeper level. |
| sequence | sequence node on the same level or one level deeper; $\Phi_1$; |
| | quantifier node on the same level. |
| quantifier | quantifier node on the same level or one level deeper; $\Phi$; |
| | sequence node on the same level. |

For example, given two matching DTDs' root element types, R1 and R2, the process matchPropagate is applied to the roots of the simplified trees of $R_1$ and $R_2$ to propagate the matches down the tree and identify matches between the name-match nodes of element types $E_1$ and $E_2$. The matchPropagate process is then applied to $E_1$ and $E_2$'s simplified trees until no new name-match node matches are generated. In this way, a sequence of transformation operations is generated by combining each of the transformation sequences used to match each of the source nodes to a matched target node in the source XML schema.

An example is now described illustrating the match discovery process between the DTD tree 300 of FIG. 3a and DTD tree 350 of FIG. 3b, in accordance with one embodiment. Suppose the following parameter settings are used, where the cost of each data capacity gap category ranks from lower to higher in the order of DC-Preserve (0.25), DC-Increase (0.5), DC-Ambiguous (0.75) and DC-Reduce (1.0). Also, the value 0.5 is assigned to both potential data capacity gap parameters $W_{required}$ and $W_{repeatable}$.

As shown in FIGS. 3a and 3b, there are 4 pairs of simplified element trees, i.e., company 320 and 370, personnel 322 and 372, person 324 and 374, and name 326 and 376, as discussed previously. The matchPropagate process is applied to the root type company's simplified element trees first. Then, the <company>$_{300}$'s children are traversed one by one. For <address>$_{300}$, its matching candidate set is empty since all the element nodes on the same level (i.e., 2) are non-rename-able. For <cname>$_{300}$, its matching candidate set contains only <cname>$_{350}$. Since they have the same name, they are matched. Similarly, <personnel>$_{300}$ is matched against <personnel>$_{350}$. The matching candidate set for attribute <id>$_{300}$ is empty.

In pass 2, <address>$_{300}$'s matching candidate set contains only <,>$_{350}$. The matchPropagate process is applied to derive the transformation script composed of an operation of relabelling "address" to ",". If the operand factor cost of relabelling a tag node to a sequence list node is the default value (e.g., Fac(op)=1), then the total relabelling cost is (DC(op)+PDC(op))*Fac(op)=(0.25+0)*1=0.25. The operand factor cost of deleting the subtree rooted at <address>$_{300}$ is the tree's leaf nodes' size, i.e., 4.

Furthermore, supposing $k_s$=1, the total cost is (DC(op)+PDC(op))*Fac(op)=(DC(op)+PDC(op))*$k_s$*s=(1.0+0)*1*4=4.0. Since this value is larger than 0.25, the <address>$_{300}$ is mapped against <,>$_{350}$. Attribute <id>$_{300}$'s matching candidate set now contains element <id>$_{350}$. Given the current parameter settings, they will be matched. The process of matching element type company is now complete, since each of <company>$_{300}$'s children has a partner.

As for matching element type personnel, the two simplified element subtrees 322 and 372 of FIGS. 3a and 3b, respectively, are isomorphic. The transformation script of matching <+>$_{300}$ against <+>$_{350}$ and matching <person>$_{300}$ against <person>$_{350}$ is then derived based on the isomorphic relationship.

For matching element type person, in the preprocessing phase, the simplified element tree shown 374 of FIGS. 4a and 3b has been converted to element subtree 474 shown in FIG. 4b. The node <name>$_{300}$ is matched against <name>$_{350}$ in pass 1. The node <?$_1$>$_{300}$'s matching candidate set includes <+$_1$>$_{350}$, <?$_1$>$_{350}$ and <+$_2$>$_{350}$. The transformation script associated with matching against <+$_1$>$_{350}$ is composed of a single operation of relabelling <?$_1$>$_{300}$ from ["?"] to ["+"].

The transformation script associated with matching against <?$_1$>$_{350}$ is composed of deleting <email>$_{300}$ and adding <url>$_{350}$. Matching against <+$_2$>$_{350}$ is associated with relabelling from ["?"] to ["+"], deleting <email>$_{300}$, adding <fax>$_{350}$, and unfolding <fax>$_{350}$. The node <+$_1$>$_{350}$ will be chosen as the partner since it is associated the least cost which is less than deleting <?$_1$>$_{300}$. Similarly, <?$_2$>$_{300}$ is matched against <?>$_{350}$ and <+>$_{300}$ is matched against <+$_2$>$_{350}$. The node <phonenum>$_{350}$ is matched against $\Phi_2$, since it is added.

For matching element type name, the simplified element tree 326 in FIGS. 5a and 3a is converted to the element tree 526c as shown in FIG. 5c. The element tree 526c is then compared to element tree 376 as shown in FIG. 3b. Suppose the synonym knowledge provides the information that family and last, given and first are synonyms, then we have <family>₃₀₀ matched against <last>₃₅₀, <given>₃₀₀ matched against <first>₃₅₀, and the subtree rooted at <?>₃₀₀ matched against $\Phi_2$.

Generation of XSLT for Transforming Documents

Based on the established semantic relationship between two DTDs, the Extensible Stylesheet Language Transformation (XSLT) language, designed for transforming individual XML documents, can be used to specify and then execute the transformation, in accordance with one embodiment of the present invention. XSLT understands exactly which nodes in the XML documents are operated on.

Figure 10:
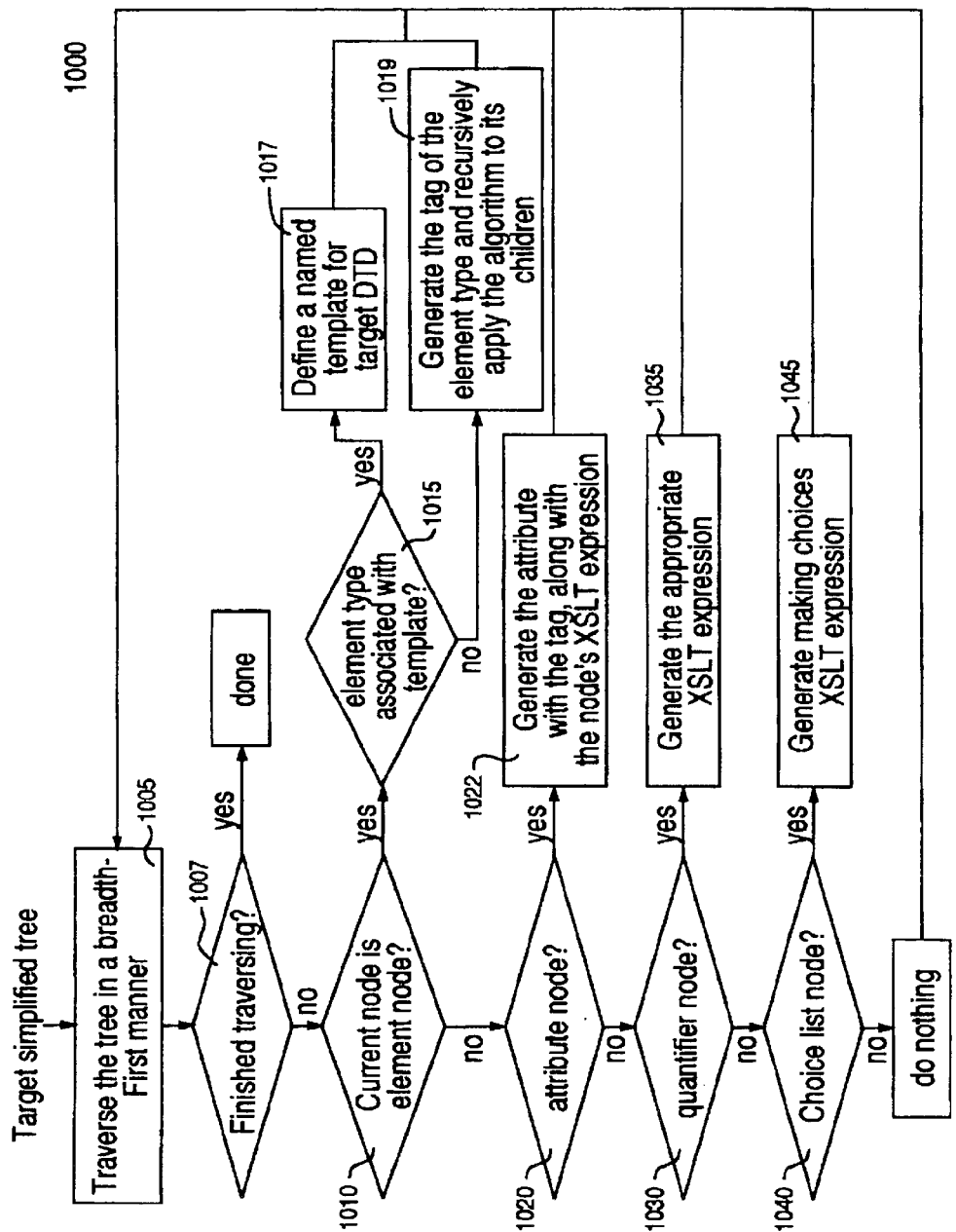
FIG. 10 is a flow diagram illustrating steps in a method for generating an Extensible Stylesheet language for Transformations (XSLT) script.

FIG. 10 is a flow chart 1000 illustrating steps in a method for converting a sequence of transformation operations into an XSLT script, in accordance with one embodiment of the present invention. Each node n in the DTD tree is associated with a set of nodes in the XML tree which can be specified by an XSLT expression. By definition, this XSLT expression is n's XSLT expression.

For each matching element type pair, the two roots of the simplified element trees associated with the element types match, and the XSLT generator generates a named template. It then will traverse the target simplified element tree in a breadth-first manner in step 1005. The present embodiment then proceeds to decision step 1007 to determine if the traverse is finished. If yes, then the process in FIG. 10 is complete. The following discussion illustrates the XSLT expressions that are generated based on the visited node, in one example, when it is determined that the tree has not been fully traversed in step 1007. The DTD 1 of Table 1 and the DTD 2 of Table 2 are used as examples for generating an XSLT script for transformation.

The type of node will determine how the XSLT transformation will occur. For example, in step 1010, if an element node is to be transformed into an XSLT expression, the present embodiment determines if the element type is associated with a template, in step 1015. A named template is defined for an element type in a target DTD, in step 1017, if it is associated with a simplified element tree pair.

For example, in Tables 1 and 2, element type person in DTD 1 matches person in DTD 2 and then there is a named template person-trans defined for deriving target instances of element type person from source instances of person. If named template person-trans has not been defined yet, the template will be then generated. Once the generator reaches the tag node with name person, it will generate the following XSLT expressions:

```
<person>
    <xsl:call-template name = "person-trans"/>
</person>
```

However, if the element type is not associated with a template in decision step 1015, then the present embodiment generates the tag of the element type and recursively applies the process to its children, in step 1019. If this element node is of type #PCDATA, then an XSLT expression, xsl:value-of> is generated.

For example, an element type name is associated with a named template name-trans. To generate this template, the generator traverses name's i simplified element trees which is composed of the root of element type name itself and two children leaf tag nodes of type first and last. The following scripts are generated:

```
<xsl:templage match = "name" name = "name-trans">
    <first>
            <xsl:value-ofselect="given"/>
    </first>
    <last>
            <xsl:value-of select="family"/>
    </last>
</xsl:template>
```

The present embodiment determines if the node is an attribute node in step 1020. If it is an attribute node, then the attribute is generated with the tag along with the node's XSLT expression, in step 1022.

The present embodiment determines if the node is a quantifier node in step 1030, then in step 1035, the present embodiment generates the appropriate XSLT expression. In one example, quantifier node n has a matching partner n'. The absence of a quantifier node between two non-quantifier nodes in DTD indicates that the content particle represented by the child node appears exactly one in the content model of the content particle represented by the parent node. Then, matching $\Phi_1$ to n (e.g., inserting n) as matching an implicit quantifier node whose properties are required and non-repeatable to n.

For example, if changing from n' to n is a data capacity preserving transformation, then the present embodiment generates a processing multiple elements XSLT expression (<xsl:for-each>). In the select clause, the present embodiment selects all the nearest descendant tag nodes of n'. For each such selected tag node, the expression <xsl: if> is generated with the test condition of deciding what element type is associated with the input node. Based on the element type, the process is recursively applied as illustrated below:

```
<xsl:for-each select = "person">
<xsl:if test = "(local-name( ) = 'person')">
    <person>
            <xsl:call-template name = "person-trans"/>
    </person>
</xsl:if>
</xsl:for-each>
</xsl:template>
```

In another case, at least one target XML data node in a target XML document is required to be instantiated while its data source, a corresponding source XML data node, is not provided. Such is the case if the transformation of changing from n' to n changes the property of "required" from not required to required, or from countable-repeatable to countable-repeatable with an increasing repeating number, but, does not change the property of "repeatable" from repeatable to non-repeatable or countable-repeatable. In such an instance, the present embodiment will generate <xsl:if> to test whether the source data is available. If not, tags for reminding that additional data is needed are generated.

For example, the following XSLT script is generated when content particle email* in element type person is changed to email+.

```
<xsl:if test = "(count(email)=0)">
    <email>
        value needed here
    </email>
</xsl:if>
<xsl:for-each select = "email">
    <xsl:if test = "(local-name( ) = 'email')">
        <email>
            </xsl:apply-templates/>
        </email>
    </xsl:if>
</xsl:for-each>
```

In still another case, a situation may arise where only a subset of multiple data sources are needed to instantiate the target XML data nodes. Such is the case if the transformation of changing from n' to n changes the property of "repeatable" either (1) from repeatable to countable-repeatable to non-repeatable, or (2) from countable-repeatable to countable-repeatable with a decrease of the repeating number, and if the transformation does not change the property of "required" from not required to required. As such, the select clause is slightly different from the routine expression <xsl:for-each> generated for the current quantifier node. By default, the present embodiment instantiates the target XML data nodes by assigning the value from the first several source XML data nodes among all the available source XML data nodes.

For example, in DTD 2 of Table 2 the following XSLT scripts are generated when person's content model, content particles fax, and fax, are replaced by fax. At most one XML data node of type fax can be present.

```
<xsl:for-each select = "fax[position( )=1">
    <xsl:if test = "(local-name( ) = 'fax')">
        <fax>
            <xsl:apply-templates/>
        21 /fax>
    </xsl:if>
</xsl:for-each>
```

Returning now to step 1040, if the present embodiment determines that the node is a list node, then for a sequence list node, no XSLT expressions are generated. However, if in step 1040, a choice list node is determined, then the present embodiment generates a making choices XSLT expression (e.g., <xsl:if>), in step 1045. Since choice list node indicates that one branch of this node's children will be chosen, <xsl:if> will change the output based on the input.

If no nodes are reached, as in element node in step 1010, or attribute node in step 1020, or quantifier node in step 1030, or choice list node in step 1040, then nothing is done, and the process returns to step 1005.

While the methods of embodiments illustrated in flow charts 200, 600, 700, 800, 900, and 1000 show specific sequences and quantity of steps for evaluating a transformation cost when transforming one XML document to another, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for evaluating a transformation cost when transforming one XML schema to another XML schema through a sequence of transformation operations, is thus described. The present invention incorporates domain-specific characteristics of the XML documents, such as, domain ontology, common transformation types, and specific DTD modeling constructs (e.g., quantifiers and type-constructors) to discover, develop, and evaluate a cost for a sequence of transformation operations. While the present invention has been described in particular embodiments, it should be appreciated that the present invention should not be construed as limited by such embodiments, but rather construed according to the below claims.

What is claimed is:

1. A method of valuing transformation between XML documents comprising:

a) measuring data loss for a transformation operation that transforms a source node in a source schema, corresponding to a source XML document, to a target node in a target schema, corresponding to a target XML document;

b) measuring a potential data loss for said transformation operation;

c) scaling operands implemented in said transformation operation to measure their impact on said data loss and potential data loss; and d) calculating a transformation cost considering said data loss, potential data loss and impact of said operands for said transformation operation.

2. The method of valuing transformation as described in claim 1, further comprising:

e) generating a first sequence of transformation operations to match and transform a plurality of source nodes in a source tree of said source schema to a plurality of target nodes in a target tree of said target schema.

3. The method of valuing transformation as described in claim 2, further comprising:

f) calculating a first transformation cost for said sequence of transformation operations.

4. The method of valuing transformation as described in claim 2, further comprising:

f) generating a second sequence of transformation operations to match and transform said plurality of source nodes to said plurality of target nodes;

g) selecting said first or second sequence of transformation operations that has a lower transformation cost.

5. The method of valuing transformation as described in claim 2, converting said sequence of transformation operations into an Extensible Stylesheet Language of Transformations (XSLT) script.

6. The method of valuing transformation as described in claim 1, wherein a) comprises:

measuring preservation of source data associated with said source schema when transforming to said target schema.

7. The method of valuing transformation as described in claim 1, wherein d) further comprises:

automatically calculating said transformation cost.

8. The method of valuing transformation as described in claim 1, further comprising:

before a), modeling said source schema and said target schema as a tree structure creating a source tree having a plurality of source nodes and a target tree having a plurality of target nodes.

9. The method of valuing transformation as described in claim 1, wherein said source schema is a source document type definition (DTD) and said target schema is target DTD.

10. A system for valuing transformation between XML schemas comprising:
- a data capacity measurement module for measuring a data capacity (DC) gap value (DC(op);
- a potential data capacity measurement module for measuring a potential data capacity (PDC) gap value (PDC (op);
- an operand factor measurement module for measuring an operand factor (Fac(op); and
- a cost module for measuring a transformation cost for measuring the preservation of data capacity contained within a source XML document, that is associated with a source schema, when transforming said source XML document to a target XML document that is associated with a target schema using a set of transformation operations.

11. The system as described in claim 10, wherein said transformation cost measures the accuracy of transforming said source schema to said target schema.

12. The system as described in claim 10, wherein said (DC) gap value (DC(op)) measures the preservation of said data capacity at a source node in said source schema when matching and transforming said source node to a target node in said target schema using said set of transformation operations.

13. The system as described in claim 10, wherein said potential data capacity (PDC) gap value (PDC(op)) measures the potential that said source node that is transformed can accommodate different data capacity than said source node.

14. The system as described in claim 10, wherein said operand factor (Fac(op)) measures the affect of operands on said DC and PDC gap values.

15. The system as described in claim 10, wherein said transformation cost relates said DC gap value, said PDC gap value, and said operand factor.

16. The system as described in claim 10, wherein said operand factor is related to a number, a size, and a property of operands associated with said set of transformation operations.

17. The cost model as described in claim 10, further comprising:
- a total transformation cost comprising the summation of said transformation costs for matching and transforming each of a plurality of source nodes in a source tree of said source schema to a plurality of target nodes in a target tree of said target schema.

18. A computer system comprising:
- a processor: and
- a computer readable memory coupled to said processor and containing program instructions that, when executed, implement a method of valuing transformation between XML documents comprising:
  a) measuring data loss for a transformation operation that transforms a source node in a source schema, corresponding to a source XML document, to a target node in a target schema, corresponding to a target XML document;
  b) measuring a potential data loss for said transformation operation;
  c) scaling operands implemented in said transformation operation to measure their impact on said data loss and potential data loss; and
  d) calculating a transformation cost considering said data loss, potential data loss and impact of said operands for said transformation operation.

19. The method of valuing transformation as described in claim 18, further comprising:
  e) generating a first sequence of transformation operations to match and transform a plurality of source nodes in a source tree of said source schema to a plurality of target nodes in a target tree of said target schema.

20. The method of valuing transformation as described in claim 19, further comprising:
  f) calculating a first transformation cost for said sequence of transformation operations.

21. The method of valuing transformation as described in claim 19, further comprising:
  f) generating a second sequence of transformation operations to match and transform said plurality of source nodes to said plurality of target nodes;
  g) selecting said first or second sequence of transformation operations that has a lower transformation cost.

22. The method of valuing transformation as described in claim 19,
  converting said sequence of transformation operations into an Extensible Stylesheet Language of Transformations (XSLT) script.

23. The method of valuing transformation as described in claim 18, wherein a) comprises:
  measuring preservation of source data associated with said source schema when transforming to said target schema.

24. The method of valuing transformation as described in claim 18, wherein d) further comprises:
  automatically calculating said transformation cost.

25. The method of valuing transformation as described in claim 18, further comprising:
  before a), modeling said source schema and said target schema as a tree structure creating a source tree having a plurality of source nodes and a target tree having a plurality of target nodes.

26. The method of valuing transformation as described in claim 18, wherein said source schema is a source document type definition (DTD) and said target schema is target DTD.

* * * * *